United States Patent [19]
Morel et al.

[11] Patent Number: 5,767,648
[45] Date of Patent: Jun. 16, 1998

[54] BASE FORCE/TORQUE SENSOR APPARATUS FOR THE PRECISE CONTROL OF MANIPULATORS WITH JOINT FRICTION AND A METHOD OF USE THEREOF

[75] Inventors: Guillaume Morel, La Varenne St Hilaire, France; Steven Dubowsky, Wellesley, Mass.

[73] Assignee: Massachusetts Institute of Technology, Cambridge, Mass.

[21] Appl. No.: 634,934

[22] Filed: Apr. 19, 1996

[51] Int. Cl.$^6$ ............................................ B25J 9/16
[52] U.S. Cl. ................................................ 318/568.1
[58] Field of Search ........................... 901/15, 9, 23, 901/28, 46, 48, 2; 318/568.1, 568.11, 568.16, 568.22, 568.24

[56] References Cited

U.S. PATENT DOCUMENTS

| | | | |
|---|---|---|---|
| 4,300,198 | 11/1981 | Davini | 318/568 X |
| 4,710,884 | 12/1987 | Tokairin et al. | 364/513 |
| 4,906,907 | 3/1990 | Tsuchihashi et al. | 318/568.22 |
| 4,925,312 | 5/1990 | Onaga et al. | 364/513 |
| 5,056,038 | 10/1991 | Kuno et al. | 364/513 |
| 5,116,180 | 5/1992 | Fung et al. | 901/9 X |
| 5,129,044 | 7/1992 | Kashiwagi et al. | 901/15 X |
| 5,130,632 | 7/1992 | Ezawa | 318/568.11 |
| 5,151,859 | 9/1992 | Yoshino et al. | 364/424.02 |
| 5,220,849 | 6/1993 | Lande et al. | 901/22 X |
| 5,260,629 | 11/1993 | Ioi et al. | 318/568.19 |
| 5,341,459 | 8/1994 | Backes | 395/95 |
| 5,497,061 | 3/1996 | Nonaka et al. | 318/568.11 |

OTHER PUBLICATIONS

D. Vischer and O. Khatib, *Design and Development of High-Performance Torque-Controlled Joints*, IEEE Trans. on Robotics and Automation, vol. 11, No. 4, Aug. 1995.

M.R. Popovic, K.B. Shimoga, A.A. Goldenberg and R.C. Hui, *Model Based Compensation of Friction in Direct Drive Robotic Arms*. J. of Studies in Informatics and Control, vol. 3, No. 1, pp. 75–78, Mar. 1994.

(List continued on next page.)

*Primary Examiner*—Karen Masih
*Attorney, Agent, or Firm*—Steven J. Weissburg

[57] ABSTRACT

An elegant, cost-effective apparatus and method is disclosed for compensating the effect of joint friction in manipuulators. The invention uses a six axis wrench sensor (also called a force/torque sensor) mounted between the manipulator and a reference body upon which it is supported. From the base wrench measurements, for rotary joints, the joint torques are estimated. The estimation apparatus uses Newton-Euler relations of successive link bodies. The estimated torque is fed back through a torque controller, that virtually eliminates friction and gravity effects. A position control loop encloses the torque controller and provides it with desired torques computed from measured position errors. For linear joints, appropriate forces are estimated. Coupled to link position sensors and the wrench sensor, is a gravity compensator, which generates a dynamic wrench signal that corresponds to the gravity compensated dynamic component of the base wrench signal, based on the position signals and the base wrench signal. Coupled to the gravity compensator and the position sensors is a joint analyzer, which generates a signal that corresponds to the gravity compensated torque that is actually applied to the link at the rotary joint, based on the dynamic wrench signal and the position signals. Both torques at rotary joints and forces at linear joints are estimated by the apparatus. Multiple and single joint manipulators can be evaluated. The achieved precision is substantially greater than for conventional methods and approaches the resolution of the Puma's encoders.

39 Claims, 11 Drawing Sheets

OTHER PUBLICATIONS

M.R. Popovic, D.M. Gorinevsky and A.A. Goldenberg, *Accurate Positioning Of Devices With Nonlinear Friction Using Fuzzy Logic Pulse Controller*, Int. Symposium of Experimental Robotics, ISER '95, preprints, pp. 206–211, Jun. 30, 1995.

J.Y.S. Luh, W.D. Fisher and R.P. Paul, *Joint Torque Control by a Direct Feedback for Industrial Robots*, IEEE Trans. on Automatic Control, vol. 28, No. 1, Feb. 1983.

L.E. Pfeffer, O. Khatib and J. Hake, *Joint Torque Sensory Feedback in the Control of a PUMA Manipulator*, IEEE Trans. on Robotics and Automation, vol. 5, No. 4, pp. 418–425, 1989.

H. West, E. Papadopoulos, S. Dubowsky and H. Cheah, *A Method For Estimating The Mass Properties Of A Manipulator By Measuring The Reaction Moments At Its Base*, Proc. IEEE Int. Conf. on Robotics and Automation, 1989.

T. Corrigan and S. Dubowsky, *Emulating Micro–Gravity In Laboratory Studies Of Space Robots*, Proc. 23rd ASME Mechanisms Conf., 1994.

M.H. Raibert and J.J. Craig, *Hybrid Position/Force Control of Manipulators*, ASME Journal of Dynamic Systems, Measurement and Control, vol. 102, 1981, pp. 126–133.

N. Hogan, *Impedence Control, An Approach to Manipulation* (Parts I, II and III), ASME Journal of Dynamic Systems, Measurement and Control, vol. 107, 1985, pp. 1–24.

D.E. Whitney, *Historical Perspective and State of the Art in Robot Force Control*, Int. Journal of Robotics Research, vol. 6, No. 1, Spring 1987.

D. Williams and O. Khatib, *Improved Force Control for Conventional Arms Using Wrist–Based Torque Feedback*, Preprints of the 4th Int. Symposium on Experimental Robotics, ISER '95, Stanford,CA, pp. 323–328, 1995.

1

BASE FORCE/TORQUE SENSOR APPARATUS FOR THE PRECISE CONTROL OF MANIPULATORS WITH JOINT FRICTION AND A METHOD OF USE THEREOF

BACKGROUND

This invention relates in general to robots and to manipulators and more specifically to the control of such devices that experience joint friction. It relates more specifically to an apparatus for estimating the torques or forces that are actually delivered by joint actuators to adjacent links.

In many new applications of robotic manipulators, such as surgery or micro assembly, the manipulator end-effector position must be controlled very accurately during small, slow motions. In some cases, the position/orientation must be controlled. In others, the force/moment applied must be controlled. In still others, position/orientation and force/moment must be controlled. The precision required is difficult to achieve with currently available systems, due to nonlinear joint friction, which can lead to stick-slip motions, static positioning errors, or limit cycle oscillations.

Previous techniques developed to deal with this problem can be classified in three categories: model based compensation, torque pulse generation, and torque feedback control.

In model based compensation, a model is used to compute an estimate of the friction torque, which is provided to the actuator controller. The friction model can be used either in feed forward compensation control [1,2], or in feedback compensation control [3]. A very accurate model is needed in this method, as there is no measurement of the friction in the joint. Such precise models can be adaptively identified [3], but they still must account for many nonlinear phenomena such as Coulomb friction, dependency on joint position, influence of changes in load and temperature, nonbackdriveability, etc. As a result of this complexity, the modeling, identification, and adaptation aspects of the model-based compensation method are not fully solved, and not likely ever to be fully solved, thus making these techniques difficult to implement in practice. The problem remains prevalent, generating many papers per year proposing solutions.

The torque pulse friction compensation method computes the width and magnitude of a torque pulse necessary to provide a small joint displacement. The computation can use either an explicit model [1] or simple rules of qualitative reasoning [4]. This approach appears to be more practicable than model based compensation, and usually a few pulses are sufficient to accurately reach the desired position in spite of Coulomb friction. However, the pulse generation method is limited to applications for which the trajectory to reach the final position is not important, since only finite displacements are controlled.

The torque feedback control technique is based on a joint torque control loop. The torque applied to the manipulator joint is sensed and fed back in a joint torque loop. This method has produced among the best experimental results found in the literature for joint friction compensation. In experiments involving manipulators with high friction gear trains, this technique has reduced the effective friction torque by up to 97% [5,6]. In addition, the method does not require any friction model and is very robust with respect to changes in load or friction torque magnitude.

Unfortunately, for a rotary joint, the method requires knowing the torque of the joint. Most commercially available manipulators are not equipped with joint torque sensors. Retrofitting such sensors in the joints of an existing manipulator would be very difficult. Also, manipulators designed to include such sensors have a number of practical problems. For example, introducing flexures instrumented with strain gages in the joint adds structural flexibilities and decreases the overall performances of the manipulator [7]. Substantial nonlinearities in the sensor output can result from the complex loading on the sensor by a joint gear train. Each individual joint sensor must be specifically calibrated. This calibration must be done on board, when the manipulator is fully assembled, to take into account the loading conditions. Consideration of the effects of gravity upon the links must be taken, in a feed forward module, by repeated applications of a gravity model at each joint. Finally, individual joint sensors are expensive, add to wiring complexity, and are subject to damage due to manipulator vibrations or overloads. The lengthy wiring required from each sensor to the processing unit is prone to pick up noise particularly when the wires pass by actuator motors.

Thus, although torque feedback control has been known to provide excellent results for over ten years, it is not broadly used due to these complexities and inadequacies, because determining the state of a joint is rather difficult.

There is, then, need for an apparatus that can provide precise position/orientation and/or force/moment control of a manipulator's end effector, even in the presence of significant joint friction. The need extends to such an apparatus that could be practically retrofitted to existing devices as well as used in new devices. Further it is desirable to achieve such precise control without introducing structural flexibilities and nonlinearities into the manipulator. It is also desirable to minimize any additional expense, complexity and fragility. It is also desirable that the mechanical design of any such apparatus be simple and robust with minimal wiring.

Thus, the several objects of the invention include to provide an apparatus that generates a signal that corresponds to the actual torque or force that is being applied by an actuator to a link, compensated for the torque or force required to overcome gravity. An additional object of the invention is to provide an apparatus that automatically eliminates the need to model or anticipate frictional effects in the joints. A further object is to provide such an apparatus that may be economically retrofitted to existing apparatus, which is robust, mechanically simple, and does not introduce structural flexibilities or nonlinearities into the manipulator.

SUMMARY OF THE INVENTION

The invention provides a new approach to deal with joint friction in manipulators performing fine motions, that overcomes the difficulties of the known methods discussed above. The invention uses a six axis wrench sensor (also called a force/torque sensor) mounted between the manipulator and a reference body upon which it is supported (see FIG. 1). For rotary joints, torques are estimated from the measurements provided by this sensor. The estimation process uses Newton-Euler equations of successive link bodies. The estimated torques are used in joint torque control loops as is done with direct torque measurements. A position control loop encloses the torque controller and provides it with desired torques computed from measured position errors. For linear joints, appropriate forces are estimated.

More particularly, a preferred embodiment of the apparatus of the invention is an apparatus for generating a signal that corresponds to the gravity compensated torque actually applied to a link at a rotary joint of a manipulator. The apparatus comprises a wrench sensor that is connected between the base and the reference body to generate a base wrench signal that corresponds to the base wrench that is applied between the base and the reference body, expressed at a sensor measurement point. Coupled to the position sensors and the wrench sensor, is a gravity compensator, which generates a dynamic wrench signal that corresponds to the gravity compensated dynamic component of the base wrench signal, based on the position signals and the base wrench signal. Coupled to the gravity compensator and the position sensors, a joint analyzer, which generates a signal that corresponds to the gravity compensated torque that is actually applied to the link at the rotary joint, based on the dynamic wrench signal and the position signals.

In one embodiment, the gravity compensator is a gravity wrench generator, which generates a signal that corresponds to the gravity component of the base wrench, based on the position signals and, coupled to the gravity wrench generator and the wrench sensor, a dynamic wrench signal generator, which generates the signal that corresponds to the gravity compensated dynamic component of the base wrench signal, based on the gravity wrench signal and the base wrench signal. The gravity wrench generator may include means for generating a vector $O_sG_j$ from the sensor measurement point to the center of mass of each link; and means for generating a gravity moment signal that corresponds to $$\sum_{j=1}^{n} O_sG_j \times m_jg,$$

where n is the number of links, $m_j$ is the mass of link j and g is the acceleration due to gravity. Alternatively, rather than generating all of the position vectors and calculating the gravity wrench, a look up table may be used that has been prepared before hand.

In general, the apparatus implements the following relation to relate the gravity compensated torque that is actually applied to the link at the rotary joint on the one hand and, on the other hand, the dynamic wrench signal and said position signals:

$$\tau_{i+1} = -z_i^t \left[ M_d^{O_i} + \sum_{j=1}^{i} (I_j \dot{\omega}_j + \omega_j \times I_j \omega_j + O_iG_j \times m_j \dot{V}_{G_j}) \right]$$

where: $\tau_{i+1}$ is said gravity compensated torque that is actually applied to the link at the rotary joint; $M_d^{O_i}$ is the moment of the dynamic wrench signal, expressed at $O_i$, which is the origin of the axis around which the link to which the torque is actually applied rotates relative to an adjacent link that is kinematically closer to the reference body; $-z_i^t[\ ]$ is an operator that projects a vector, onto an axis $z_i$, which axis is at $O_i$; i is the number of the movable links that are kinematically closer to the reference body than the link to which the gravity compensated torque is actually applied. For each link j of the i movable links: $I_j$ is the inertia tensor at its center of mass $G_j$; $\omega_j$ is the angular velocity relative to a fixed frame; $\dot{\omega}_j$ is the angular acceleration; $\dot{V}_{G_j}$ is the linear acceleration of the center of mass; $O_iG_j$ is the vector between $O_i$ and the center of mass $G_j$; and $m_j$ is the mass.

Rather than implementing this entire relation, for a specific manipulator, or for particular tasks where the dynamic or gravity terms are either negligible or constant, the relation reduces to fewer terms. Typically, however, knowledge of the positions of each of the links is required.

Another embodiment of the invention is an apparatus for determining the force that is applied at a linear joint of a manipulator. The apparatus is similar to that described above for a rotary joint. However, the specific relation that is implemented by some embodiments of the invention with respect to a force is:

$$f_{i+1} = -z_i^t \left[ F_d + \sum_{j=1}^{i} m_j \dot{V}_{G_j} \right].$$

In this case, the variables are as follows: $f_{i+1}$ is the gravity compensated force that is actually applied to the link at the linear joint; $F_d$ is the force of the dynamic wrench signal; the axis $z_i$, which axis is at $O_i$, is the origin of the axis along which the link to which the force is actually applied translates relative to an adjacent link that is kinematically closer to the reference body. The remaining parameters are the same as above.

Other embodiments of the apparatus of the invention include similar apparatus for determining the torque applied at a rotary joint of a single link manipulator and for determining the force applied at a linear joint of a single link manipulator.

Of course, the foregoing apparatus can be combined into a single apparatus that can perform all of the functions of assessing the force or torque, as the case may be, at a joint, whether it is linear or rotary.

Another preferred embodiment of the invention is a method for generating a signal that corresponds to the gravity compensated torque actually applied to a link at a rotary joint of a manipulator. The method comprises the steps of: generating a base wrench signal that corresponds to the base wrench that is applied between the base and the reference body, expressed at a sensor measurement point. Gravity is compensated for by generating a dynamic wrench signal that corresponds to the gravity compensated dynamic component of the base wrench signal, based on the position signals and the base wrench signal. A signal is generated that corresponds to the gravity compensated torque that is actually applied to the link at the rotary joint, based on the dynamic wrench signal and the position signals.

Another preferred embodiment of the invention is a method for determining the gravity compensated force that is actually applied at a linear joint of a manipulator. This method is similar to that described for a rotary joint.

Typically, the method of the invention evaluates the appropriate relation, or reduced version thereof, as set out above.

Further embodiments of the method of the invention can be used to determine the force or torque at a single joint manipulator.

BRIEF DESCRIPTION OF THE DRAWINGS

These and other features, aspects, and advantages of the present invention will become better understood with regard to the following description, appended claims and accompanying drawings, where:

DETAILED DESCRIPTION

Figure 1:
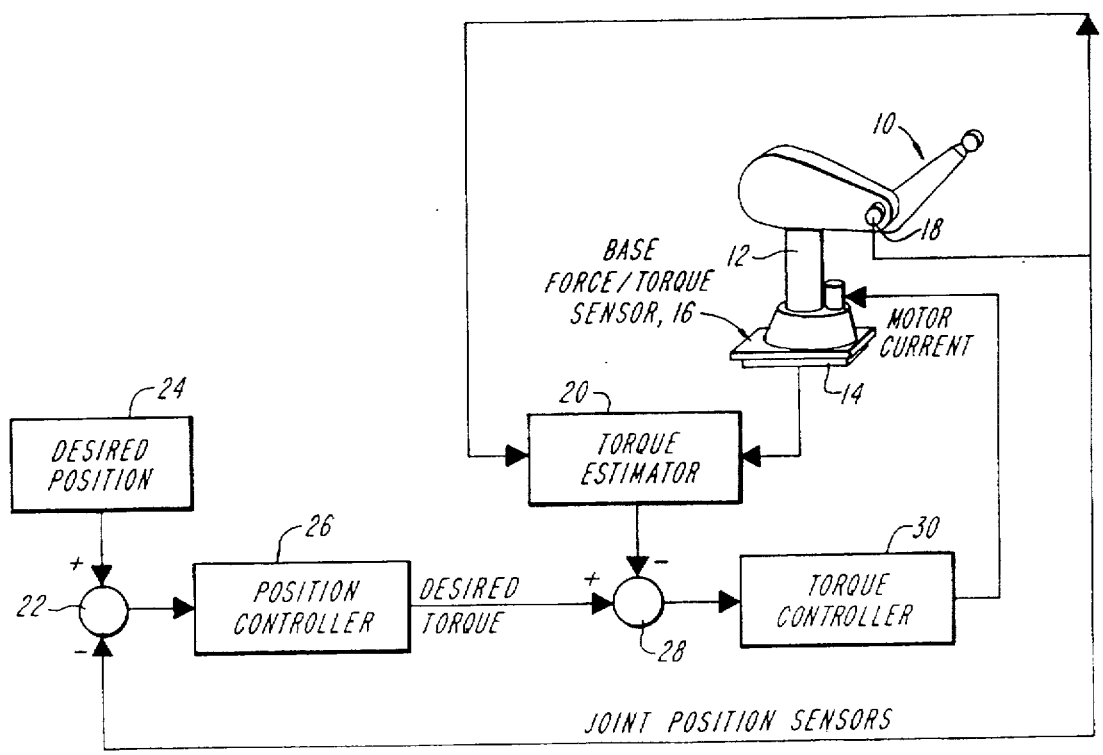
FIG. 1 is a schematic block diagram showing a preferred embodiment of an apparatus that incorporates the invention, showing a manipulator and control modules.

A preferred embodiment of the apparatus of the invention is shown schematically in block diagram form in FIG. 1. A manipulator 10 has a base 12, which is connected to a reference body 14 (such as the ground or a shop floor) through a base mounted force/torque sensor 16, also referred to herein and in the literature as a wrench sensor. (A "wrench" is a compact way of describing the force and torque condition of an interaction, defined as a vector consisting of the force vector and the moment vector that describes a mechanical interaction). The manipulator shown is a six degree of freedom manipulator having six joints. However the invention is useful for robots having any degree of freedom and any number of joints.

As used in this specification and the claims, the term "base" refers to so much of the manipulator as is kinematically between the first joint and the base force/torque sensor. This portion of the manipulator does not move relative to the reference body.

All of the joints shown in the manipulator 10 are powered with rotary actuators. Each joint is equipped with an angular encoder, of which a representative one 18 is shown. These encoders combined with an initialization (or "calibration") routine generate signals that correspond to the angular orientation of any link j relative to the link j−1, which is closer to the reference body 14 than is the link i.

Joint Torque Estimation

The output signals from the wrench sensor 16 and the angular encoders 18 are passed to a torque estimation unit 20, for instance by cables or wireless transmission, such as RF, IR or any appropriate channel. The torque estimation unit, as described more fully below, takes the wrench signal and the angular orientation signals, and processes these signals along with data signals that represent other properties of the manipulator (such as the mass and moments of inertia of its links, its geometry, as described in more detail below) and generates as an output a signal that corresponds to an estimate of the torque that is actually being applied by the actuator at any selected joint to the link that is further from the reference body 14 than the actuator.

This torque signal is "compensated" for gravity. By "compensated" it is meant that the signal represents only so much of the torque that is actually being applied by the actuator to generate the motions of the link in question, but not to resist the urging of gravity. In other words, it estimates the torque that would be required to move the body as it moves, in an environment where gravity is not acting.

It is important to note that the estimate is the gravity compensated torque that is actually being applied to the link, as opposed, for instance, to a torque value that is computed based on the current supplied to a rotary motor. An estimate computed on the basis of the current is subject to error due to frictional and other losses that reduce the torque that is actually applied to the link.

The signals from the joint position encoders (or sensors) are fed back to a position error generator 22, which takes as its other input a desired angular position signal that is provided by a desired position signal generator 24. This signal provides the desired angular position for each joint of the manipulator that is desired to be controlled. The corresponding components of these two signals are compared to generate a position error signal that is received by a position controller 26, which generates a desired torque signal based on the position error. The desired torque signal is compared with the estimated torque at a torque error generator 28, which generates a torque error signal to a torque controller 30. The torque controller 30 issues current commands to the motors of each of the joints to move the motor components with the desired torque to achieve the desired position. The goal of the torque controller 30, described more fully below, is to make the torque error equal to zero. Thus, the torque controller 30 will automatically, over time, compute the motor current to make the estimated torque equal to the desired torque. In particular, it will overcome the friction to achieve that goal.

Before describing the components of the torque estimator 20, it is helpful to review the theoretical issues that ground its operation and design.

Theoretical Issues

In this section, the basic dynamic equations used by the torque estimator of the invention in the torque estimation process are developed.

Figure 3:
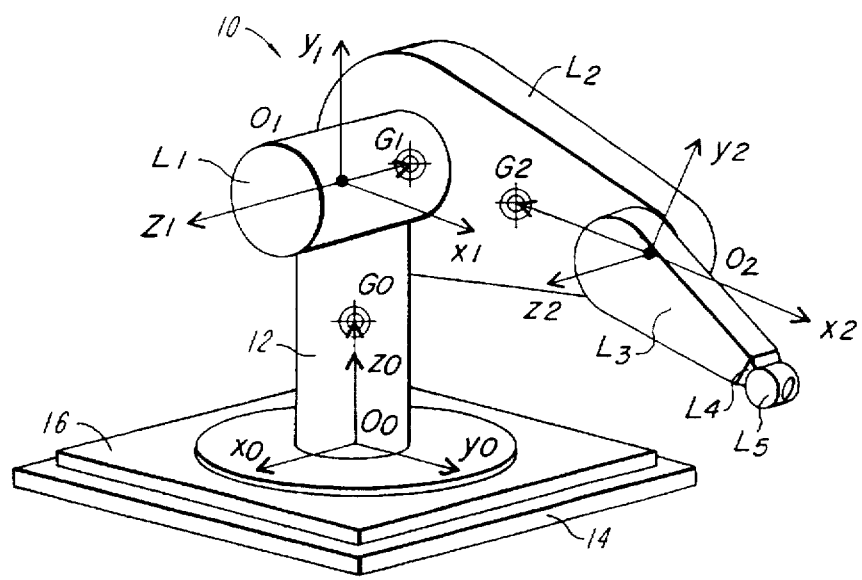
FIG. 3 shows schematically a manipulator (a Puma brand model 550) with link frames of reference attached, following the Denavit-Hartenberg notation, equipped with a base wrench sensor.

With reference to FIG. 3, consider a manipulator 10 mounted on a reference body 14 through a base wrench (force/torque) sensor 16. The wrench $W_b$ exerted by the manipulator 10 on its supporting reference body 14 can be expressed as the sum of two wrenches:

$$W_b = W_g + W_d \quad (1)$$

where $W_g$ is the wrench due only to the action of gravity. $W_d$ is the dynamic wrench, due only to the motions of the manipulator. The dynamic wrench would be zero if none of the links were moving. It would be the only wrench applied by the manipulator on the reference body if the manipulator were in a gravity free environment. The dynamic wrench is also referred to herein as the gravity compensated wrench. The gravity wrench would be zero if the manipulator were in a gravity free environment. It would be the only wrench applied by the manipulator on the reference body if no link of the reference body were moving.

It should be noted that the base sensor measures wrenches that correspond only to forces and torques effectively transmitted to the manipulator's links. Hence transmission friction does not contribute to the measured base wrench, which would be the same for friction free actuators as it would be for high friction actuators (assuming the motion and position of the robot is the same).

The first theoretical step in the estimation process is to generate the gravity component $W_g$ and compensate for it, in order to estimate the dynamic component $W_d$. This step is also implemented in a real embodiment of the invention. The gravity wrench is compensated for using the following model [8]:

$$W_d = W_b - W_g = W_b - \begin{pmatrix} F_g = \sum_{j=1}^{n} m_j g \\ M_g^{O_s} = \sum_{j=1}^{n} O_s G_j \times m_j g \end{pmatrix}, \quad (2)$$

where $F_g$ and $M_g^{O_s}$ are the vectors that represent the gravity force and moment expressed at the measurement point $O_s$ of the sensor 16, which is typically its center, $m_j$ and $G_j$ are the mass and the position of the center of mass of link j, respectively, and g is the acceleration due to gravity. The gravity wrench is set out in brackets in Eq. (2). The sensor measurement point of the sensor is not identified in FIG. 3. $O_s G_j$ represents a vector from the sensor measurement point to the center of mass of link j.

The value of the gravity compensated dynamic wrench $(W_d)$ can be computed because the total wrench $W_b$ is measured, the masses are known and positions of the links relative to the sensor measurement point are readily determined by analysis of the angular position signals from the angle encoders 18. The masses can either be know a priori, or determined using the wrench sensor, such as is taught by [8], which is incorporated herein fully by reference.

In the following analysis, the gravity compensated wrench $(W_d)$ is propagated through the successive links j of the manipulator 10. This results in estimated joint torques that do not include the joint gravity component.

Figure 4:
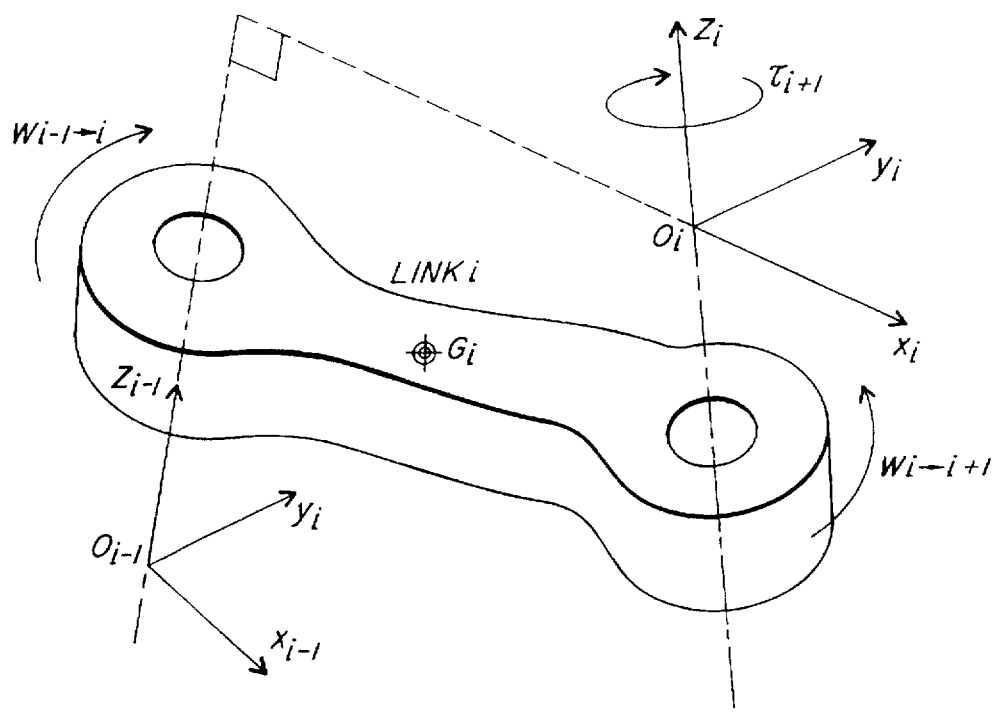
FIG. 4 shows schematically the application of Newton-Euler equations to a representative link i of a manipulator used in connection with the invention.

The Newton Euler equations of the first i links are, after gravity compensation:

$$\begin{cases} W_{0 \to 1} = -W_d \\ W_{1 \to 2} = W_{0 \to 1} - W_{dyn_1} \\ \vdots \\ W_{i \to i+1} = W_{i-1 \to i} - W_{dyn_i} \end{cases} \quad (3)$$

where $W_{i \to i+1}$ is the wrench exerted by the link i on the link i+1 as shown schematically in FIG. 4 and $W_{dyn_i}$ is the resultant dynamic wrench for the link i. $W_{dyn_i}$ can also be expressed at any point A (whether within the body of the manipulator or not) in terms of the acceleration $\dot{V}_{G_i}$ of $G_i$, the angular acceleration $\dot{\omega}_i$ and the angular velocity $\omega_i$, all with respect to a fixed frame.

$$W_{dyn_i} = \begin{pmatrix} F_{dyn_i} = m_i \dot{V}_{G_i} \\ M_{dyn_i}^A = I_i \dot{\omega}_i + \omega_i \times I_i \omega_i + G_i A \times m_i \dot{V}_{G_i} \end{pmatrix}, \quad (4)$$

where $I_i$ is the inertia tensor of link i at $G_i$. Summing the equations (3) yields:

$$W_{i \to i+1} = -W_d - \sum_{j=1}^{i} W_{dyn_j}. \quad (5)$$

Figure 2:
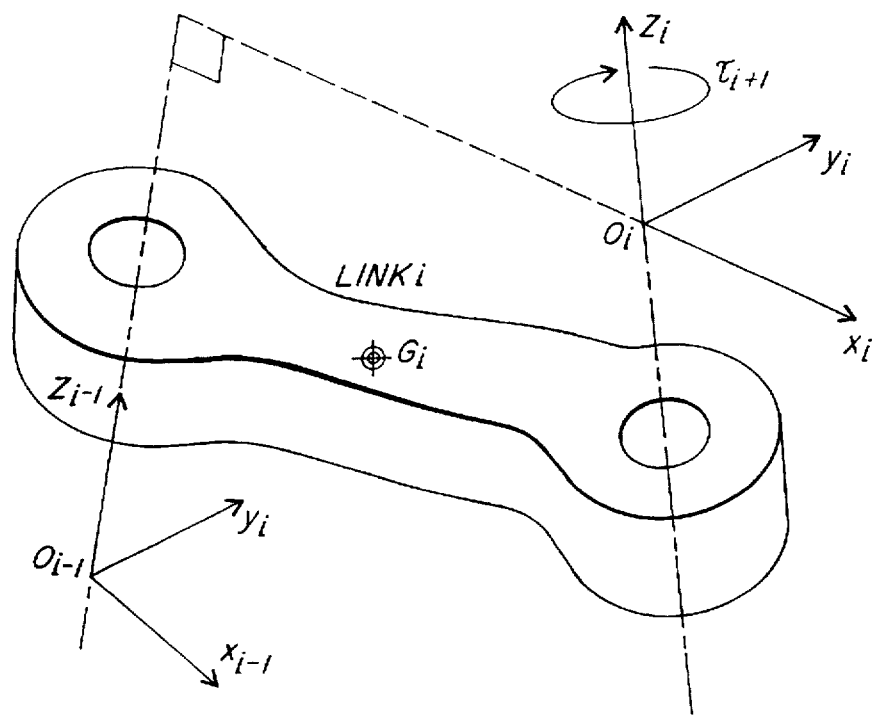
FIG. 2 is a schematic representation of a typical link i in a manipulator, showing the axes used to characterize the link, and its center of mass $G_i$.

Given this wrench, the torque in joint i+1 (between links i and i+1) is obtained by projecting the moment vector at $O_i$ along $z_i$ (indicated by the operator $-z_i^T[\ ]$ in the following expression) (FIG. 2):

$$\tau_{i+1} = -z_i^T \left[ M_d^{O_i} + \sum_{j=1}^{i} (I_j \dot{\omega}_j + \omega_j \times I_j \omega_j + O_i G_j \times m_j \dot{V}_{G_j}) \right], \quad (6)$$

where $M_d^{O_i}$ is the moment of the dynamic wrench developed in Eq. 2, expressed at $O_i$, which is the origin of the axis around which the link i+1 rotates relative to the link i. (This is equal to $M_d^{O_s} + O_s O_i \times F_d$ where $M_d^{O_s}$ is the dynamic portion of the wrench at the sensor origin and $F_d$ is the dynamic portion of the force, both of which are known because Eq. (2) can be evaluated as discussed above.

Figure 15:
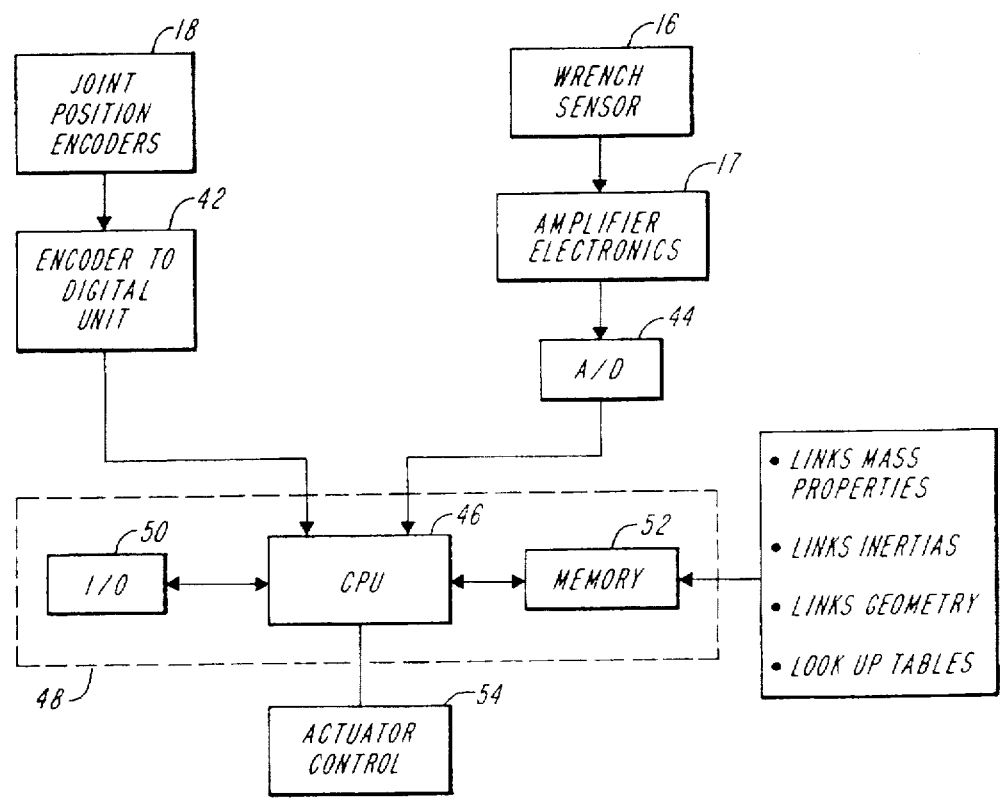
FIG. 15 is a schematic block diagram showing an embodiment of a portion of the invention, including a wrench sensor, joint encoders, and signal processing equipment for using the signals from the wrench sensor and the joint encoders to estimate a component of the wrench applied at a joint within a manipulator such as is shown in FIG. 1.

Eqs. 2 and 6 can be used in the torque estimator 20, which can be implemented as a programmed general purpose computer 48, as is shown in more detail in FIG. 15. Signals from the wrench sensor 16 are amplified through a voltage amplifier 17 and passed through analog to digital convertor 44. The digitized signals are passed to a central processing unit 46 of a programmed general purpose computer 48 having a memory 52 and input output devices 50, such as a keyboard, mouse, monitor, etc. Joint position encoders, 18 duly initialized using any regular additional joint equipment (zero switches, potentiometer or whatever is convenient) are transmitted to the CPU 46 through an encoder-digital unit 42. The memory is provided with data that represent the masses m of the n links, their moments of inertia I, the locations of their centers of mass G (with respect to the link frame), the locations of the axis O that are aligned with the points of connection between links (with respect to the link frame), and any other parameters that describe the geometrical and mass properties of the manipulator links.

With signals representing these parameters, the processor can be programmed to evaluate Eq. 2 and then Eq. 6 for each link, thereby generating a signal that is passed to the actuator control 54 (which is a general instance of the torque control 30 shown in FIG. 1) which is an estimate of the actual torque, compensated for gravity, that is being delivered by each actuator to each link to which it is attached.

Typically, the torque estimator is constituted as a programmed general purpose computer, as shown in FIG. 15. This programmed computer can also be programmed to perform the functions of the position control 26, torque control 30 and position and torque comparators 22 and 28 respectively, shown in FIG. 1.

Alternatively, as is known to the person skilled in the art, the estimator and the other modules can be implemented as dedicated, special purpose processors or circuitry, with dedicated memories, either ROM or writable. Decisions as to which configuration will be used depend on the environment in which the manipulator is to be used, cost, space, flexibility, etc.

Figure 16:
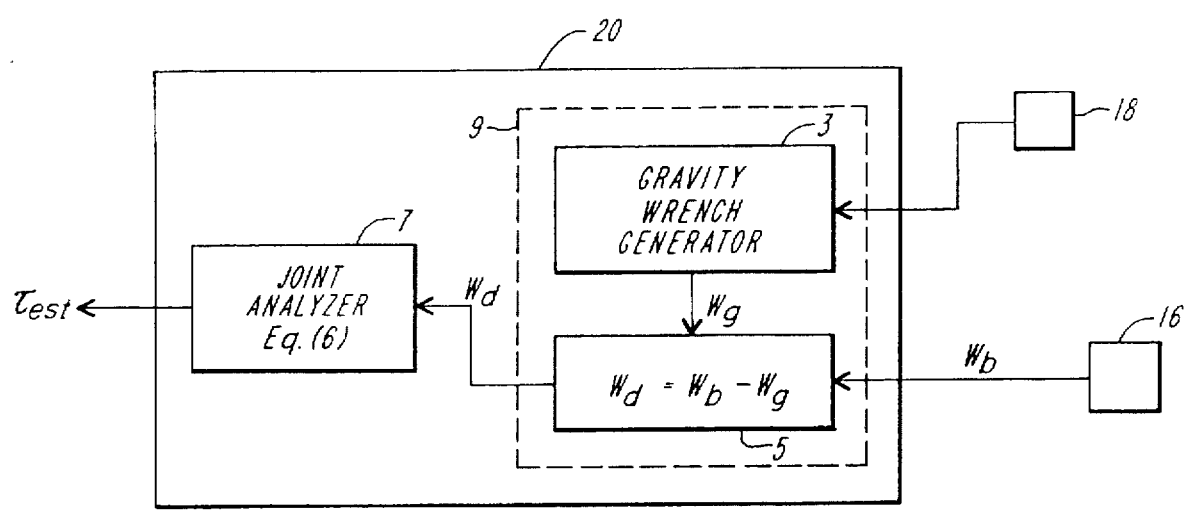
FIG. 16 is a schematic block diagram of a preferred embodiment of a torque estimator of the invention.

A schematic representation of the torque estimator 20, implemented as special purpose processors, is shown in FIG. 16. Signals from the joint position encoders 18 are passed to a gravity wrench generator 3, that implements the part of Eq. 2 in the brackets to generate the gravity component $W_g$ of the measured base wrench signal $W_b$. The gravity wrench generator 3 also makes use of other inputs, not shown, such as data specifying the masses of the links. Alternatively, a look-up table, that specifies the gravity wrench for a given combination of joint positions, can be used. Once determined, the gravity wrench $W_g$ is subtracted from the measured wrench signal $W_b$ in the dynamic wrench signal generator 5, to result in the gravity compensated, dynamic wrench $W_d$. The gravity wrench generator 3 and the dynamic wrench signal generator 5 can together be considered a gravity wrench compensator 9. The dynamic wrench $W_d$ is passed to a joint analyzer module 7, which implements Eq. 6, and generates as its output the estimated torque for the joint in question. The joint analyzer 7 also uses the joint position signals generated by the joint position encoders 18, as well as data that represents the masses, moments of inertia and the locations of the centers of mass of the links, as above.

Application to a Representative Manipulator Puma 550

The general equations presented above can be significantly simplified when applied to a particular manipulator, for instance a Puma brand manipulator, model 550, sold by Staubli Unimation, Inc., of Duncan, S.C. FIG. 3 shows schematically, a five joint Puma 550 manipulator 10 mounted on a base wrench (force/torque) sensor 16. A suitable six axis base force torque sensor is sold by AMTI, Advanced Mechanical Technologies, Inc., of Watertown, Mass., under trade designation MC12-1000.

It has been shown experimentally, for a different purpose, that the total gravity wrench can be efficiently and accurately estimated by developing equation (2) as a function of joint angles [9]. The work conducted in this reference had nothing to do with analyzing or controlling the motion of the manipulator. Rather, its goal was to move the reference body to which the manipulator was attached, as if there were no gravity. Thus, it was necessary to know the total wrench due to gravity acting on the reference body as a result of the total manipulator. However, there was no need and no attempt to consider the implications of the gravity wrench on the state of the actuators in the manipulator.)

The actual implementation of Eq. 2 is simplified, because it is applied to a given design (PUMA 550). For the specific implementation of the PUMA 550, calculation of the gravity wrench $W_g$ is simplified as follows. Note that this estimation of $W_g$ does not include the constant part, which does not depend on the configuration of the manipulator, and only includes the position dependent part. The constant part is compensated at the initialization, when the base sensor is zeroed (the constant part is assumed to be a sensor offset). Eq.(2) reduces to:

$$W_g = \begin{pmatrix} F_g = 0 \\ M_g^{O_i} = \begin{bmatrix} S_1 & -C_1 \\ -C_1 & S_1 \\ 0 & 0 \end{bmatrix} \begin{bmatrix} \alpha_1 + \alpha_2 C_2 + \alpha_3 C_{23} + \alpha_4 S_{23} \\ \alpha_5 \end{bmatrix} \end{pmatrix}, \quad (6.5)$$

where: $\alpha_j$ depends on $m_j$, $G_j$ etc.; and $C_k$, $S_k = \cos(q_k)$, $\sin(q_k)$.

To estimate the torques $\tau_1$, $\tau_2$, and $\tau_3$ generated by the first three joints of the Puma, applied to the links $L_1$, $L_2$ and $L_3$, respectively, the following assumptions are made:

$W_b$ is measured directly in the reference frame that has its origin at $O_1$, by applying an appropriate calibration matrix to the sensor measured voltage. (See FIG. 3).

The center of mass $G_1$ of the link $L_1$ is on the $z_1$ axis, which is a reasonable assumption because it is true; and Off-diagonal terms in the inertia tensors $I_1$ and $I_2$, expressed in frames $G_1$, (x1, y1, z1) and $G_2$, (x2, y2, z2) respectively, can be neglected, which is also reasonable because they are known to be quite small.

For the three joints, these assumptions yield, respectively:

$$\tau_1 = -z_p{}' M_d{}^{O_1} = -(0,0,1)' M_d{}^O{}_1 \quad (7)$$

$$\tau_2 = -z_1{}' M_d{}^{O_1} = -(s_1 x_0, -c_1 y_0, 0)' M_d{}^O{}_1 \quad (8)$$

$$\tau_3 = \tau_2 - a_2(s_2 c_1, c_2 c_1, c_2)' F_d + \quad (9)$$

$$[A_1 c_2 + A_2 s_2]\ddot{q}_1 + A_3 \ddot{q}_2 + A_4 \dot{q}_2{}^2 + [A_5 c_2{}^2 + A_6 s_2{}^2 + A_7 c_2 s_2]\dot{q}_1{}^2$$

where $a_2$, $A_1$ to $A_7$ are constant scalar values depending on masses, inertia and lengths of the two first joints (see appendix A), $q_i$ is the angular orientation of link i relative to the link i-1, and $(s_i, c_i)$ stands for $(\sin(q_i), \cos(q_i))$.

A Typical Implementation

The torque estimation requires knowledge of the angular positions of adjacent links (also referred to as "joint positions", or "joint angles"), and their, velocities and accelerations relative to the reference body. Joint positions may be precisely measured with standard optical incremental encoders. In addition, a digital signal processor board such as sold by Delta Tau Data Systems, Inc., of Northbridge, Calif., under trade designation PMAC-VME Board, acquires the encoder data and performs differentiations and filtering, at a sampling rate of 2500 Hz, to compute the velocities and accelerations. By experiment, estimation of the position derivatives using this hardware is sufficiently fast and precise, since neither noise nor delay corrupt the torque estimation process.

Knowledge of mass and inertia properties is also required in the estimation process. In a present implementation of the invention, these values have been identified using the base wrench (force/torque) sensor as suggested in [9]. However, other, more conventional methods can be used. For instance, if a manipulator manufacturer were to include such a torque estimator as part of a manipulator, it could measure all of these parameters precisely using more conventional techniques, and include them in the software provided with the manipulator.

The torque estimation calculations required for the Puma 550 described above are not computationally intensive.

Using a single 68020 Motorola VME CPU board sold by Heurikon Corp. of Madison, Wis. supporting VxWorks V.4.o.2. real time development software sold by Wind River Systems, Inc., of Alameda, Calif., a 300 Hz sampling frequency was achieved to measure the base wrench, compensate for the gravity (Equation 2), compute the torques (Equations 7, 8 and 9) and control the torque control loop presented in the next section.

Torque Control

Open Loop Results

Open loop experiments have been conducted to provide a relevant model for the torque control design, and to evaluate the accuracy and the validity of the torque estimation apparatus and process. The experiments consisted of applying a given voltage to the input of the power amplifiers and simultaneously estimating the torques at the joints with the base wrench sensing apparatus. From the experimental results, a very simple model of the Puma actuators has been derived.

The amplifiers (that transform the controller voltage output into a proportional motor current), actuators and transmissions can be modeled as a linear term $K_{act}$ with a disturbance torque $\tau_{dist}$ that accounts for unmodeled non-linear effects. The torque $\tau_{load}$ provided by the actuator to the joint is:

$$\tau_{load} = K_{act} V_{command} + \tau_{dist}. \quad (10)$$

where $V_{command}$ is the controller voltage output.

Figure 7A:
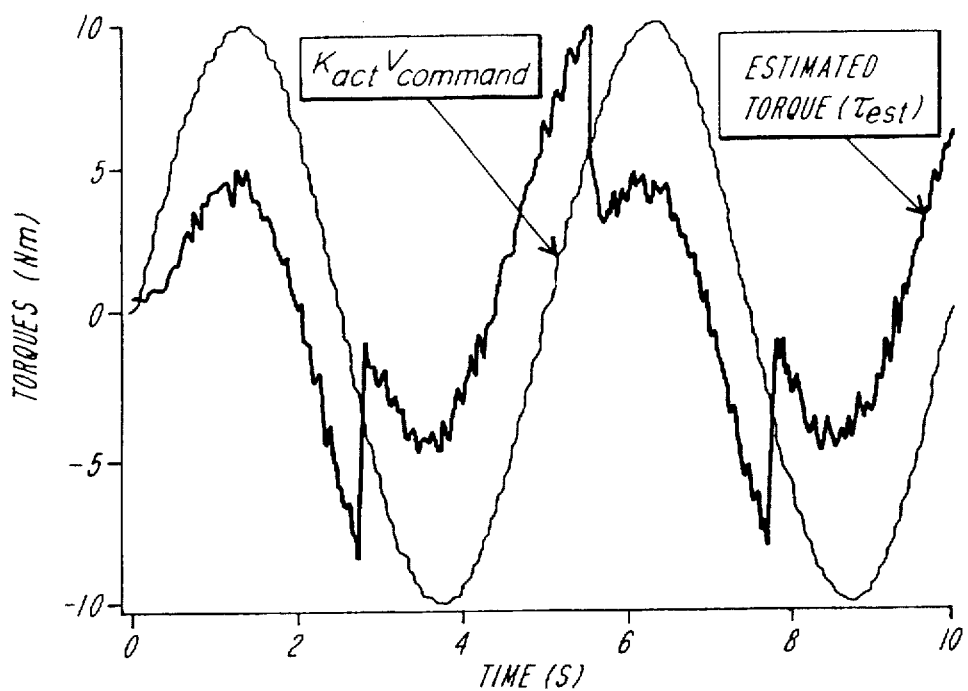
FIG. 7A shows schematically the open loop torque response results of an open loop experiment for joint 1 of a manipulator shown in FIG. 3.

FIG. 7A, which shows graphically an open loop result for the first joint, between the base link $L_0$ (which is fixed to the base 12) and the link $L_1$, shows the validity of the model. The base sensor estimated torque reproduces the input voltage sine wave with a disturbing torque whose sign is changed when the velocity sign changes. This disturbance torque (computed using Eq. 10, where $\tau_{est}$ is used instead of $\tau_{load}$) appears to be mostly a Coulomb friction term, as shown in FIG. 7B which shows that when the velocity changes sign, the friction approximates a step function at the point of switching from one value to another, of an opposite sign.

Also, note that the estimated joint torque has very low noise, due to the quality of the force sensor and its accompanying electronics.

Closed Loop Control

Figure 7B:
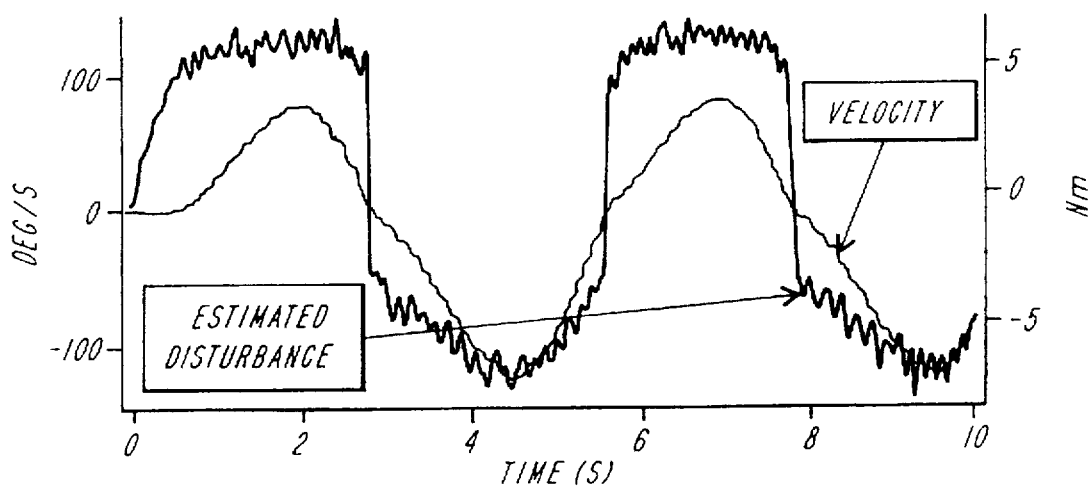
FIG. 7B shows schematically the friction characteristics of an open loop experiment for joint 1 of a manipulator shown in FIG. 3.

As shown in FIG. 7B, open loop experimental results exhibit very large Coulomb friction. In very fine motion applications, friction will be much larger in magnitude than the dynamic torque desired to be applied to the load. Hence, a high DC gain in the torque controller is required to compensate for this static friction disturbance.

Considering this, the torque control law implemented is an integral controller with feed forward compensation:

$$V_{command} = \frac{1}{K_{act}} \left[ \tau_{des} + K_{int} \int_0^t (\tau_{des} - \tau_{est}) \right], \quad (11)$$

where $\tau_{des}$ and $\tau_{est}$ are the desired and the actual (i.e. base-sensed) torques, respectively.

Linear analysis of an experimentally derived model of a one DOF robot has suggested that an integral compensator provides the best performance in force/torque control [10]. It achieves low-pass filtering and zero steady state error, whereas a proportional compensator could introduce instability, and a derivative compensator is ineffective and difficult to implement. While this study also suggests that a feed forward compensator should not be used in conjunction with integral control, experimental work by the present inventors (with a real nonlinear system) shows some improvement in the torque control performance when a feed forward term is used.

The control gain $K_{int}$ was tuned to 75% of the value that caused experimental structural oscillations.

Experimental Results

Figure 5:
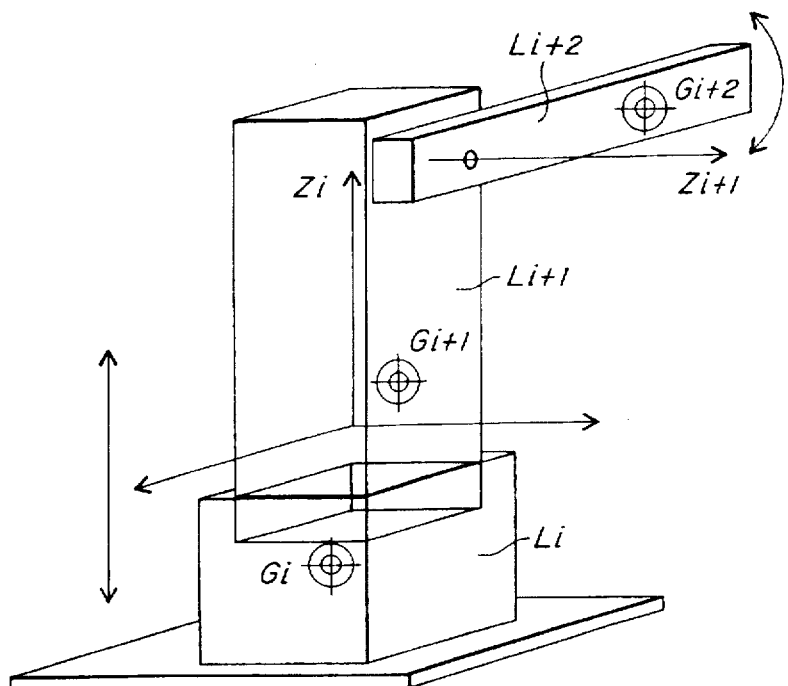
FIG. 5 shows schematically a hybrid robot, having both rotary and linear joints.

FIG. 5 demonstrates the effectiveness of base sensed torque control for the first joint (for torque applied to the link $L_1$ of the Puma 550 around the axis $Z_0$, FIG. 3). For this demonstration, the gravity compensation is not required because the first joint has a vertical axis of rotation. Gravity does not result in a moment about this axis. Therefore, no gravity compensation was conducted for this experiment.

Figure 8A:
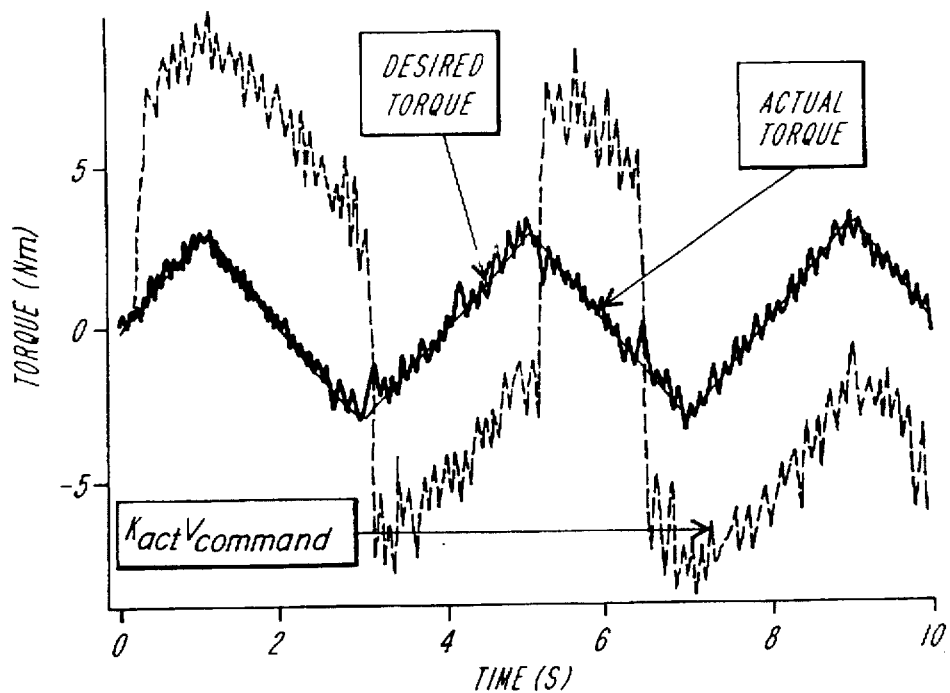
FIG. 8A shows schematically the torque control response results of an open loop experiment for joint 1 of a manipulator shown in FIG. 3.
Figure 8B:
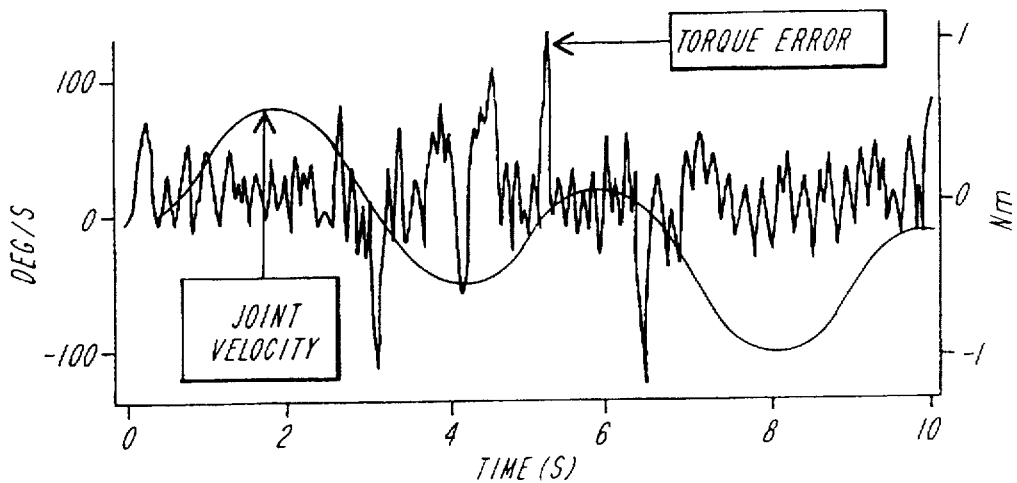
FIG. 8B shows schematically the torque error results of the open loop experiment for joint 1 illustrated in FIG. 8A.

In this example, the desired torque to be actually delivered to the link $L_1$ (compensated for gravity) by the actuator between this link and the base 12 is a triangular function with a maximum value of 3 Nm, while the dry friction is more than 5 Nm. Without torque feedback, if the motor were provided with current to deliver 3 Nm, the actual torque applied to the link would simply be zero, as the friction would be larger than the motor torque. However, with estimated torque feedback, the experimental results show that the actual torque remains very close to its desired value (FIG. 8A). In FIG. 8A, the triangular signal appears to constitute one trace, but it is actually two: one for the desired torque and one for the estimated torque with the estimated torque measured by the base wrench sensor estimator and method described above. The torque controlled motor must produce nearly 8 Nm to obtain the next 3 Nm required by the command. FIG. 8B shows that when the sign of the angular velocity changes (smoothly varying curve, measured along the left hand vertical scale), involving a large torque disturbance, (for instance at time equals three seconds) the torque error peak remains small (±1 Nm, i.e. 20% only of the Coulomb friction) and is compensated for quickly.

Figure 9:
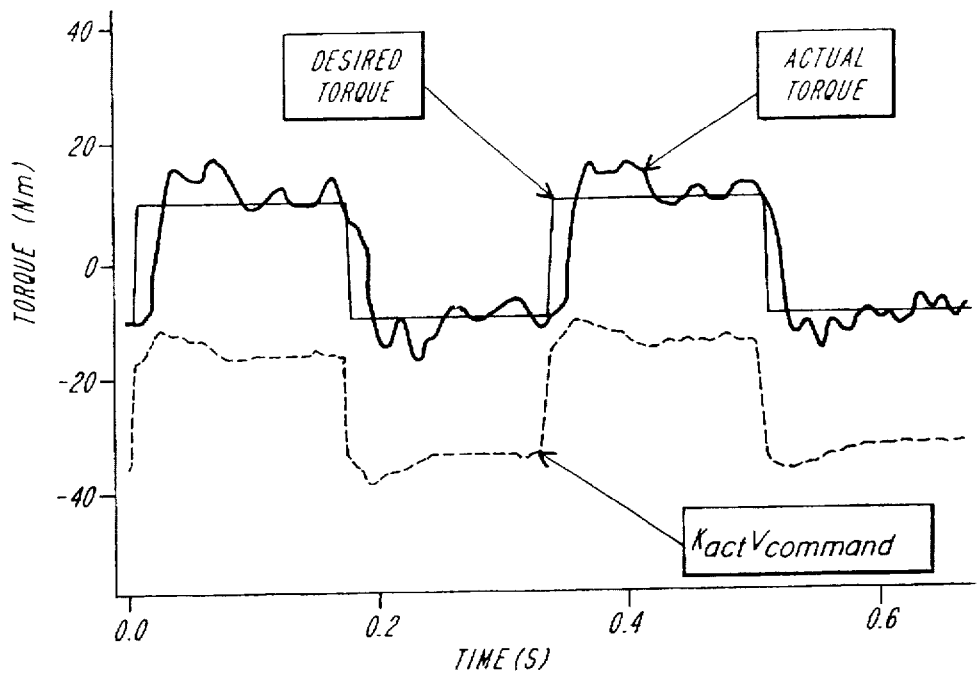
FIG. 9 shows schematically the torque control response results of an open loop experiment for joint 2 of a manipulator shown in FIG. 3.

In FIG. 9, experimental results for the Puma's second joint are shown for a desired torque to be applied to the link $L_2$ (around the horizontal axis $Z_1$ (FIG. 3)) varying at 3 Hz, between ±10 Nm. The results for this joint are different from first joint (FIG. 7A) because: 1) The second joint is experiencing gravity while the first joint was not; 2) The sign of the velocity remains constant during the experiment. The square wave input corresponds to a square wave acceleration, symmetric with respect to the zero axis, which corresponds to a triangular velocity signal having a constant sign (either positive or negative). Because the magnitude of the motion is small (a few degrees) the gravity torque is almost constant. Also, because the velocity sign is constant, the friction does not vary significantly (see FIG. 7B showing that the friction variation in the first joint appears mainly on velocity sign changes). Therefore the torque delivered by the motor to provide an estimated torque equal to the desired torque is equal to the sum of the desired signal and a roughly constant value, attributable to gravity and joint friction.

An important feature of using a base sensor and the method described above, as opposed to using individual torque sensors in each joint, is that the gravity need be compensated for only once, from the base measured wrench. Conversely, if one were to use direct torque sensing methods, such as sensors in each joint, it would be necessary to provide a gravity joint torque compensation model for each joint of the manipulator. The computations would need to be performed for each joint. Thus, the contributions to the gravity wrench that are provided by links that are distant from the reference body would be computed over and over again, for each joint between the link in question and the reference body. This is computationally wasteful, as compared to the base sensor invention described herein.

Position Control With Torque Feedback

Controller Design

The base measured torque feedback method has been used where the manipulator had a zero desired gravity compensated applied torque for each link, and external forces were applied to the end-effector. In this case, the manipulator 10 behaves virtually as a frictionless and free-floating device.

Figure 10:
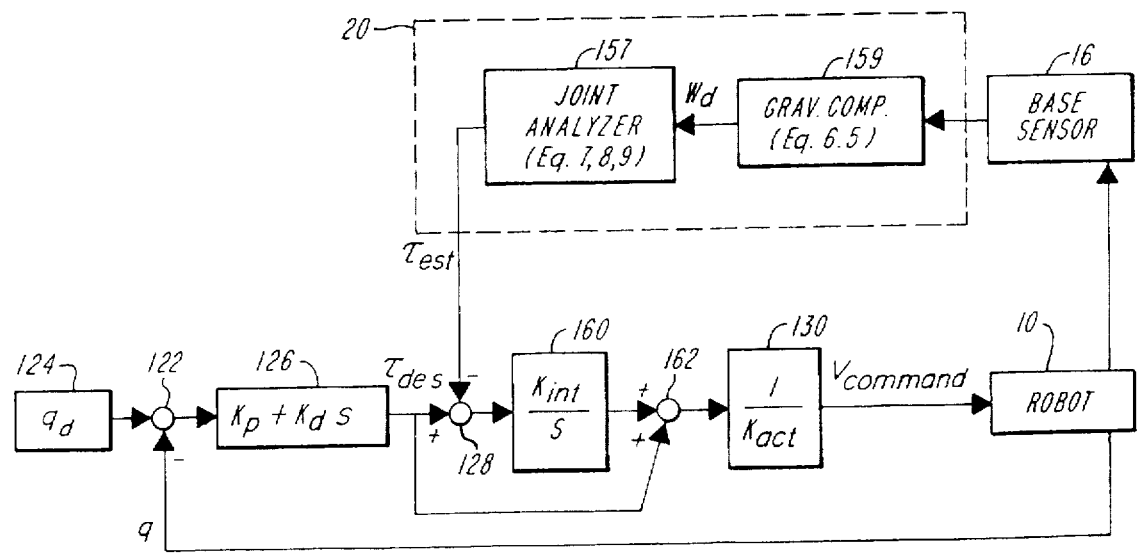
FIG. 10 shows schematically in block diagram form a precise position control scheme with base sensed wrench feedback.

The apparatus is shown schematically in FIG. 10. The manipulator 10 is again provided with a base wrench sensor 16, which provides a wrench signal to a torque estimator 20. The torque estimator 20 is composed of a gravity compensation module 159, which generates signals that correspond to both the dynamic and the gravity portions of the measured base wrench, implementing equation 2 for a general case, or Eq. 6.5 for the particular case of a Puma 550. A signal that corresponds to the gravity compensated dynamic wrench $W_d$ is output to the joint analyzer, stage 157 of the torque estimator 20, which implements equation 6, for the general case, or equations such as 7, 8 and 9, for the particular case of a Puma 550.

The angle encoders (not shown) of the manipulator 10 pass their signals to the position error generator 122, which compares them to the desired position signal from the desired position signal generator 124. This position error signal is input to a position control module 126, which implements the proportional and derivative torque gain control to generate a desired torque signal. The desired torque signal is compared with the estimated torque signal at a torque error signal generator 128, which error signal is input to an integrator 160 with integral gain $K_{int}$. The output of this integrator is combined with a feed forward signal of the desired torque, at a summing operator 162, which is input to a linear gain 130, that generates the command voltage that is applied to the manipulator motors to achieve the desired motion.

Precise position control can be achieved using a simple PD loop enclosing the torque controller. The final controller is shown schematically in FIG. 10:

$$V_{command} = \frac{1}{K_{act}} \left[ \tau_{des} + K_{int} \int_0^t (\tau_{des} - \tau_{est}) \right] \quad (12)$$

with: $\tau_{des} = K_p(q_d - q) + K_d(\dot{q}_d - \dot{q})$, (13)

where $K_p$ and $K_d$ are the proportional and derivative diagonal gain matrices, respectively.

Because the torque control loop eliminates any significant frictional effects, the position control tuning (to determine $K_p$ and $K_d$) is very straightforward and corresponds to a linear second order system. Assuming that an average value for the joint inertia is $J_i$, $K_p$ and $K_d$ are chosen as:

$$K_p = J_i \omega_o^2 \quad (14)$$

$$K_d = 2\xi J_i \omega_o^2, \quad (15)$$

where $\omega_o$ is the closed loop band width that the user wants to provide and $\xi$ is the damping coefficient the user wants to provide.

The robustness and effectiveness of the base sensed torque control apparatus and method is illustrated in the following additional experimental results.

Joint Space Experimental Results

The task considered is to move the link $L_1$ (FIG. 3) very slowly, tracking a triangular position wave. The magnitude of the desired motion is ±0.1 degrees, with a period of 10 seconds. This corresponds to a desired velocity for the encoders used, of seven encoder counts per second.

The base sensed torque feedback control apparatus and method of the invention, implemented as shown schematically in FIG. 10 has been experimentally compared with conventional PD and PID position controllers for this task. For these three controllers, the proportional and derivative positions gains have been tuned to provide a bandwidth of 5 Hz and a damping ratio of 0.5. The integral gain in the PID control has been selected to be quite high, equal to 80% of the smallest value exhibiting instability.

Figure 11A:
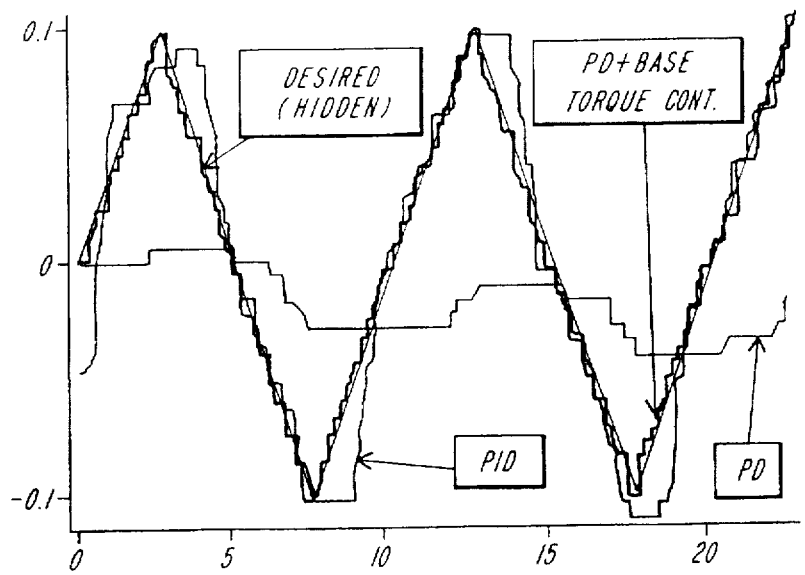
FIG. 11A shows graphically the joint position tracking performance for an experiment using the apparatus of the invention with the precise position control scheme illustrated in FIG. 10.
Figure 11B:
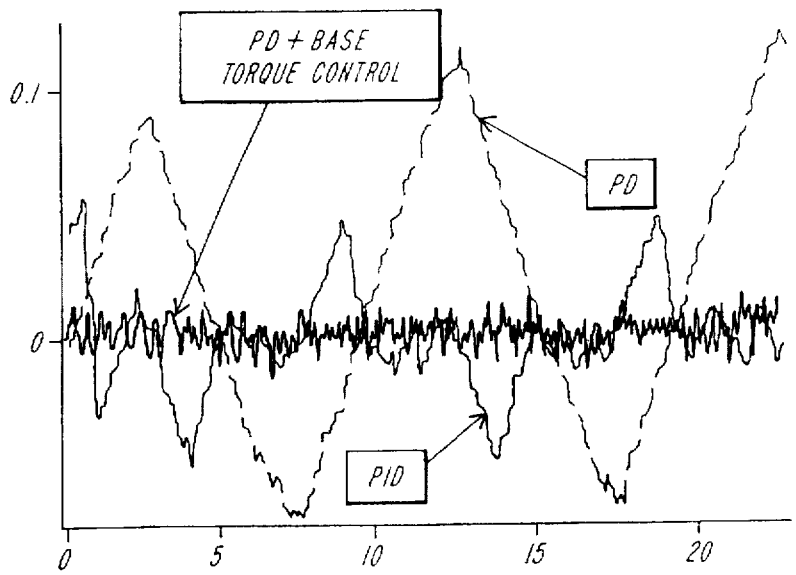
FIG. 11B shows graphically the joint position error for the experiment illustrated in FIG. 11A.

FIGS. 11A and 11B displays the improved performance provided by the base sensed torque feedback. Conventional PD control leads to almost no motion, due to dry friction. The PID controller performs much better, and provides a zero steady state positioning error (FIG. 11B). However, when the sign of the velocity changes, for instance at t=2.5 or 7.5 s, the position integral compensator requires a long time (~2.5 s) to compensate for the friction disturbance, resulting in lack of positioning precision. On the other hand, the base sensed torque feedback control apparatus compensates rapidly for the Coulomb friction at velocity sign changes (~50 ms) and the position error remains close to zero during the task.

Table 1 quantitatively summarizes the performances of the three controllers. The results of base sensed torque control show that the resolution of the encoder is reached. An encoder count corresponds to a 0.0058 degree angle, and thus that the Root Mean Square error (0.0042 deg) is less than one encoder count throughout the entire task.

TABLE I

Summary of position control performances.

| Controller | Max. Error (deg) | Root Mean Square error (deg) | Integral Square error (deg² s) |
|---|---|---|---|
| PD | 0.12 | 0.059 | 7.7 10⁻² |
| PID | 0.056 | 0.020 | 9.1 10⁻³ |
| PD + base sensed torque control | 0.012 | 0.0042 | 4.0 10⁻⁴ |

Cartesian Space Experimental Results

Figure 12:
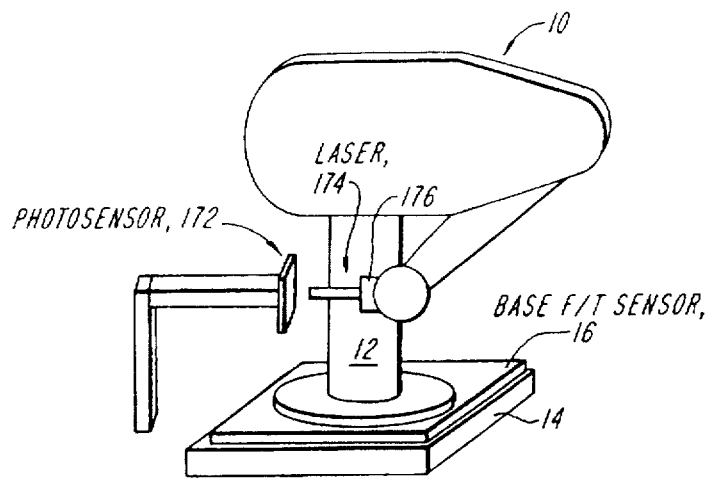
FIG. 12 shows schematically a setup for a Cartesian space experiment illustrating the effectiveness of the invention.

Cartesian space motion tasks require the end-effector to track a desired trajectory illustrated schematically with respect to FIG. 12. From this desired path, the desired trajectories of the first three links $L_1$, $L_2$ and $L_3$ (the wrist joints 170 are locked during these experiments) are computed off-line using inverse kinematics and provided in a look-up table stored in computer memory. Thus, the control scheme is unchanged (FIG. 10).

For very fine motion tasks, the torque estimation process is simplified. It has been found experimentally that the precision performance is not affected by assuming the following:

$W_g$ is assumed to be constant, and is set equal to the initial static wrench measured with the base sensor.

The dynamic terms in equations (7) to (9) are neglected.

Hence the experimental results shown thereafter have been obtained with a controller that does not require any knowledge of the robot's mass properties.

The desired end-effector trajectory is a circle with a 350 μm radius. The robot configuration is selected such that the corresponding joint displacements are maximized. In such a configuration (FIG. 12), the maximum magnitude of the joint motions is 0.1 degrees.

To verify the end-effector positioning performance, an external position sensor 172 was used. This 2D photodetector measures the position of a spot of light created by a laser 174 mounted on the robot's end-effector 176 (FIG. 12).

Figure 13:
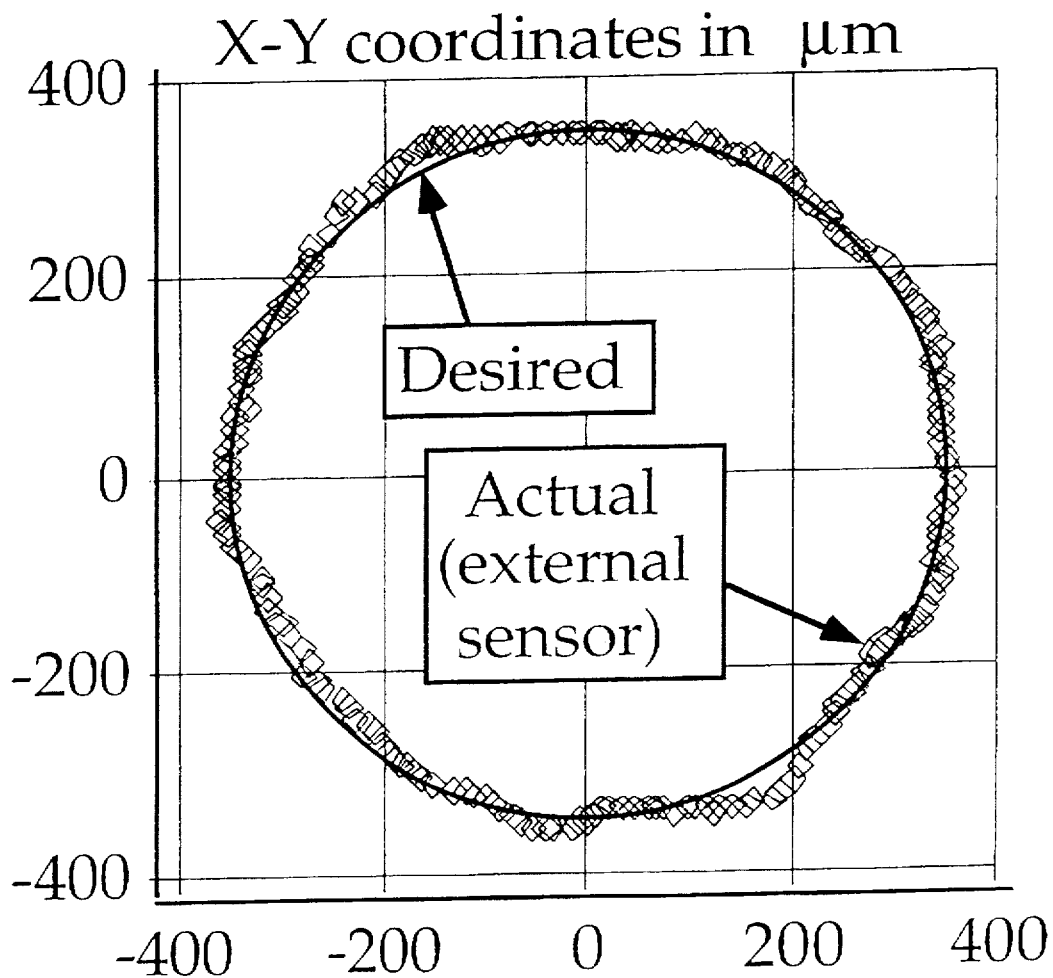
FIG. 13 shows the results of the Cartesian tracking experiment using the setup shown in FIG. 12 and the apparatus of the invention.

FIG. 13 shows the Cartesian tracking results in the sensor coordinate frame. The desired trajectory is a circle and the actual, external sensor path is a slightly broader trace that generally tracks the desired trajectory. Since the motion is cyclic, the sign of the velocity changes at least once in all the three joints during the motion. This results in large frictional disturbances. Despite these perturbations, the precision remains excellent: the maximum absolute position error is less than 30 μm, the root mean square error is about 10 μm.

Using a Base Force/Torque Sensor Without Computing the Wrench due to Gravity

The use of the apparatus described to this point has assumed that the signal processing equipment computes the gravity portion of the measured wrench, $W_b$, so that the dynamic portion of the wrench can be determined by subtracting the gravity portion from the measured wrench. As described above, this is computed using Eq. 2, or, in a special case, an equation corresponding to Eq. 6.5, based on knowledge of the values for the mass properties of the links. It is also possible, to generate a table of the gravity compensated wrench $W_g$ for many joint position combinations, and then use that table to look up the gravity portion of the wrench, rather than computing it. This is useful for operations that are repeated many times, through an identical trajectory each time.

The table is generated by moving the manipulator through the trajectory an initial time, very slowly or incrementally, so that the dynamic portion of the wrench is essentially zero. Thus, the measured wrench $W_b$ is equal to the gravity portion of the wrench, $W_g$. The measured values are recorded in a look-up table for each of the desired locations, and are used when the manipulator is moved through the trajectory at an operational speed. An advantage of this technique is that the gravity wrench need not be computed. It is only necessary to look it up. This is typically faster. It is also very accurate, not being subject to modeling errors. This technique is also useful when the manipulator is moving through only a small region of space, for which the gravity wrench in every position can be measured initially and stored in a table.

Linear Joints

The foregoing discussion has focused mostly on rotary joints. The examples have been conducted using rotary joints. However, the invention is fully applicable to hybrid manipulators that include linear joints along with rotary joints, such as is shown in FIG. 5.

FIG. 5 shows a portion of a robot having a rotary joint and a linear joint. The joint between the links $L_i$ and $L_{i+1}$ is linear and the joint between the links $L_{i+1}$ and $L_{i+2}$ is rotary. The invention can also be used for manipulators having only linear joints or only rotary joints. In order to analyze the force actually being applied at a linear joint, compensated for gravity, the apparatus and method of the invention is the same as that described above. A base wrench sensor is introduced between the manipulator and the reference body to which it is attached in the same manner. All of the theoretical relations underlying the analysis are the same. The only difference is that, rather than projecting the component of the moment of the wrench around an axis at a joint, what is computed is the component of the force along an axis at a joint. For instance, the analog to Eq. 6 for the gravity compensated force actually applied between the links $L_i$ and $L_{i+1}$ of FIG. 5 along the $z_i$ axis would be:

$$f_{i+1} = -z_i^t \left[ F_d + \sum_{j=1}^{i} m_j V_{G_j} \right]. \tag{16}$$

No other special considerations need to be taken, even if some of the joints between the joint under analysis and the reference body are rotary and some are linear. The relation described by Eq. 5 is general. Due to the way that the $\omega_j$ and $V_{G_i}$ terms are computed as a function of encoder signals, Eq. 5 automatically takes into account the nature of the joint (rotary or linear translational).

A Preferred Embodiment of the Method of the Invention

Figure 6:
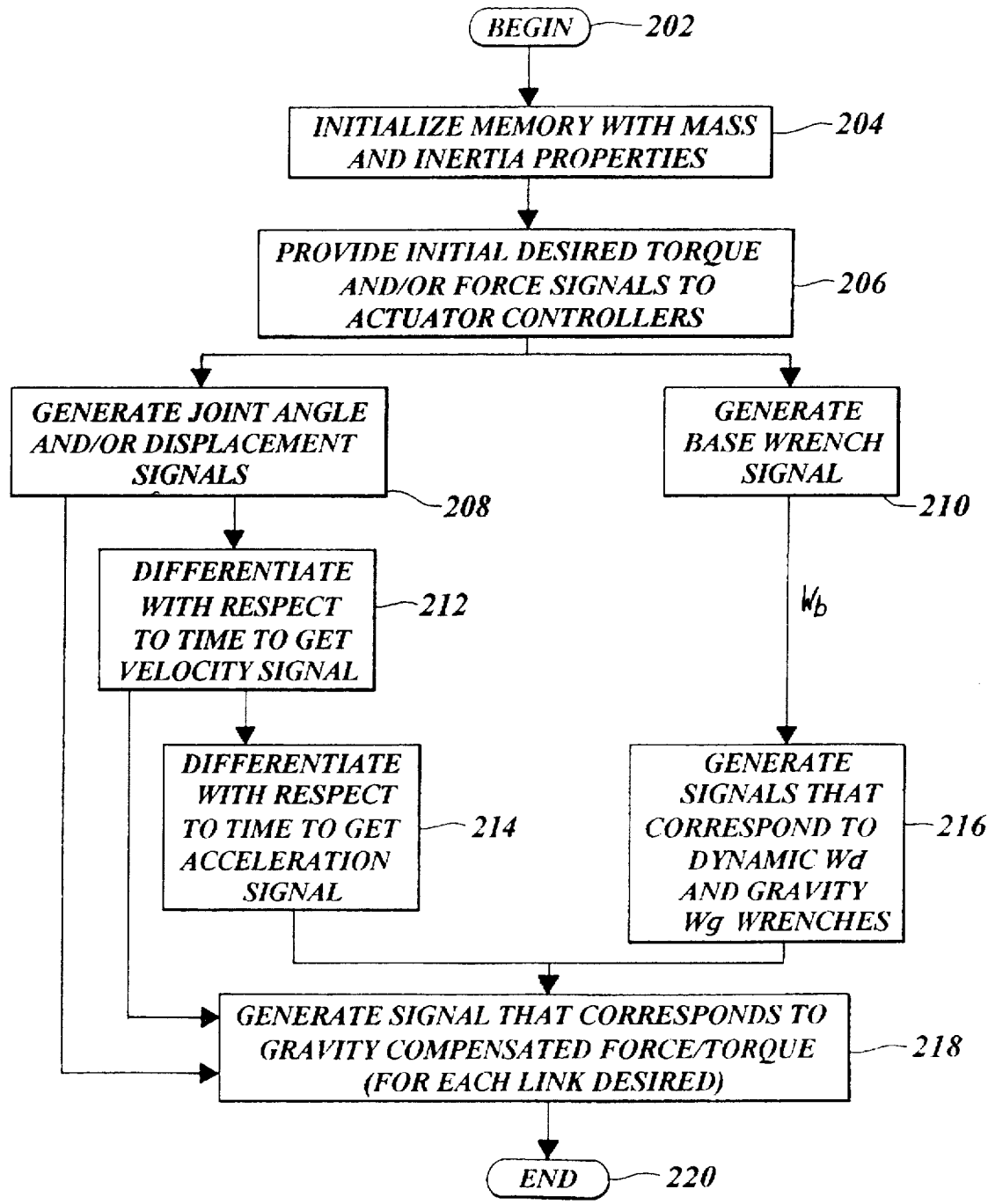
FIG. 6 shows schematically in flow chart form the steps of a preferred embodiment of the method of the invention of generating a signal that corresponds to a component of the actual, gravity compensated force or torque that is applied to a selected link of a manipulator.

Although a preferred embodiment of the method of the invention has been described above in connection with the apparatus of the invention, it is helpful to review such an embodiment, as illustrated schematically in flowchart form in FIG. 6.

Figure 14:
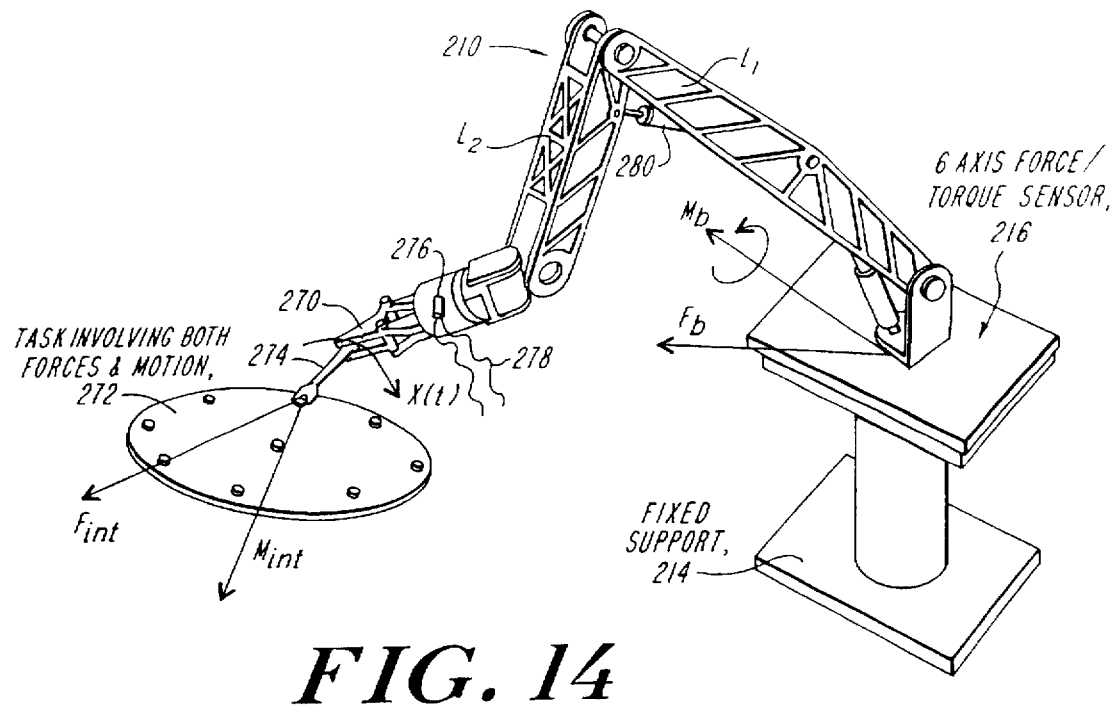
FIG. 14 shows schematically an embodiment of the apparatus of the invention for use with manipulators that interact with the environment, exchanging a wrench with the environment at the end effector.

The method begins at 202. At 204, a system memory is initialized with the mass and inertia parameters. These parameters can be obtained in any reasonable fashion, including using the base sensor to measure them, as taught in [9]. If the gravity wrench and/or trajectory position is to be determined using look-up tables, these are also initialized at this time. The manipulator joints are set in motion by providing 206 the actuator controllers with signals that represent the initial desired force or torque, as the case may be depending on whether or not the joint in question is linear or rotary. (Note that if the joint is rotary, then a desired torque is determined, even if the actuator that generated the torque is a linear piston, such as is shown in FIG. 14, arranged to create a torque around the joint. In such a case, another routine is conducted to relate the output of the actuator to the desired torque or force to be applied through the joint.) The joint angle and/or displacement signals are generated 208 by angle encoders, displacement scales, or other appropriate apparatus. Simultaneous with the joint angle/displacement signal generation, the base wrench sensor generates 210 a wrench signal.

The joint angle/displacement signals are differentiated once 212 and then again 214 to provide velocity and acceleration signals, respectively. These signals are differentiated over a sampling period in a conventional manner. From the total base wrench signal, $W_b$, signals that represent the gravity $W_g$, and dynamic $W_d$, wrenches are generated 216. These signals are then processed, along with the position, velocity, acceleration, mass and inertia signals, in accordance with Eq. 6, (or Eq. 7, 8, and 9) to generate a signal that corresponds to the desired component of the wrench (force or torque) at the joint desired to be analyzed. Such a method is carried out for each link desired to be analyzed.

It will be understood that, while Equation 6 completely describes the component of the wrench desired to be determined, in many cases, many of the terms can be neglected or simplified. This may be due to the geometry of the manipulator, such as in the example discussed initially above, or the small size of certain parameters (such as velocity and acceleration during very fine motion), as in the example shown most immediately above. Thus, it may be possible to implement the invention with far fewer terms for some or all of the links desired to be analyzed. However, these simplified cases are also contemplated as part of the invention. In fact, it will be the rare case where it is necessary to analyze Eq. 6 with all terms being non-zero, or non-combinable with other terms.

Using the Base Sensor in Conjunction with a Conventional End-Effector Force/Torque Sensor The base wrench sensing apparatus and method has been discussed above in connection with situations where there is no force or moment transmitting interaction with the environment. This is a special, although common case. The invention of a base wrench sensor can also be used where there are force and/or moment interactions with the environment, as shown schematically with reference to FIG. 14.

FIG. 14 shows a situation similar to that shown in FIG. 3, with the further addition of an end effector sensor, and additional signal processing equipment. A manipulator 210 is attached to a fixed reference body 214 through a six axis wrench (force/torque) sensor 216, as above. The wrench sensor generates a signal that corresponds to the wrench measured at the sensor origin, composed of a moment component $M_b$ and a force component $F_b$ of the wrench $W_b$.

The manipulator is equipped with an end effector 270 that interacts with an element in the environment 272, such as tightening a bolt with a wrench 274. The task involves both motion X(t) (including both translation and rotation around and a force $F_{int}$ and a moment $M_{int}$, both of which are expressed as vectors.

Using the apparatus and method of invention to realize such tasks could be done in several ways, in conjunction with different existing position/force control techniques that are well known in robotics, such as Hybrid Position/Force control [11] or Impedance Control [12].

All these techniques suppose that, at the lowest level of the control, the joint torques can be driven with enough accuracy. Thus, compensating for joint friction will provide a significant improvement in the performance of the overall system.

The first way of exploiting the invention is to estimate the joint torques using a very similar analysis, but including a few changes that are described below. First, Eq. (1) is replaced by:

$$W_b = W_s + W_{tot},  \quad (17)$$

where $W_{tot}$ is the wrench that is due to both motions of the manipulator and external interaction ($W_{tot}=W_{int}+W_{dyn}$). Second, in Eq (2) and following, the subscript $_d$ is replaced by the subscript $_{tot}$.

Using this analysis, the torque (or force) that is estimated corresponds to the torque (or force) actually applied at the joint to provide both the motion of the robot and the interaction wrench, compensated for gravity.

For some control schemes which could be used in conjunction with the invention, it is necessary to separately control the torque (or force) that corresponds to the interaction wrench and the torque (or force) that corresponds to the link's motions. This could be achieved by exploiting the wrist force/torque sensor measurement, $W_{int}$. From this wrench, the amount of torque due to the interaction, $\tau_{int}$, is given by:

$$\tau_{int} = J_A(q)^T \cdot \begin{pmatrix} F_{int} \\ M_{int}^A \end{pmatrix}, \quad (18)$$

where A is a point of the end-effector, q is the joint position, and $J_A(q)$ is the Jacobian of the manipulator at A. This quantity can be then subtracted from the total torque to get the amount of torque due to the motion.

Some manipulators interact with the environment at points other than or in addition to the end effector. In such a case, a wrench sensor should be located at each point that is likely to interact with the environment, in such a way as to sense the wrench so that it can be incorporated into the Newton-Euler analysis.

Hydraulic and Other Actuators

The base wrench sensing apparatus and method can be applied to manipulators having hydraulic actuators as well, such as the Schilling Titan II manipulator, sold by Schilling Development Inc., Davis, Calif. This kind of manipulator experiences a very large amount of friction at the joints, due to the seals in the actuators. In addition, the actuator behavior is not linear, as it nearly is for an electric motor. Finally it is virtually impossible to control precisely the torques applied to this kind of robot and to realize delicate and/or precise tasks. The method used is strictly the same for the joint torque (or joint force) estimation. The difference stands in the torque control scheme which is accomplished by conventional or other means, that do not depend on the present invention. The same can be said for other types of actuators, such as linear electric motors (known also as "Sawyer" motors), and any other type of actuator.

The apparatus and method of the invention can be used with simple, single joint manipulators. In such a case, the relation 6 for the gravity compensated torque that is actually applied reduces to $\tau_1 = -z_0'[M_d^o]$, where the terms are as defined above. Similarly, for a single joint manipulator, the gravity compensated force that is actually applied reduces to $f_1 = -z_0'[F_d]$.

Thus, an embodiment of the method of the invention is a new method to compensate for joint friction in fine motion control of manipulators. Previous methods require either a complex modeling and identification process or expensive, delicate, noise sensitive sensors that must be designed into the equipment. An apparatus to carry out the method of the invention has also been disclosed, including a base wrench sensor and signal processing equipment that carries out the method of the invention.

The method and the apparatus of the invention is very practical. A preferred embodiment of the apparatus of the invention is a 6 axis wrench (force/torque) sensor mounted at the base of the manipulator. The sensor is external to the robot and hence can be easily retrofitted under existing manipulators.

A torque estimation process, as well as a controller design, have been developed. No friction model is required during any stage of the development. In addition, for very fine motion applications, the method does not require any knowledge of the mass properties.

The experimental results show a very substantial enhancement of the manipulator capabilities. At the joint level, the precision reaches the encoders' resolution. At the end-effector, during very slow displacements, the position error remains smaller than 30 μm.

The invention has been described above in connection with compensating the measured wrench for the wrench required to overcome a gravitational field. The invention can also be used to compensate the measured wrench for any field that is uniform and can be modeled. For instance, the invention could be used to compensate for the effects of a uniform, or known magnetic field, acting on magnetically responsive elements, or a fluid flow field, such as air or water, acting on elements immersed in a flowing stream of fluid. The wrench for these environments is simply calculated in a corresponding manner as has been the gravity based wrench, and its effects are compensated for in the same manner as are those of the gravity wrench. Thus, the invention can be used in situations where such a different type of force field is present, either in the presence of gravity, or in the absence of gravity.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

For instance, the invention can be used with either rotary, helical or linear joints or actuators, or a combination of any of the three. The apparatus of the invention can be used in any control system, for instance any control scheme that is used with wrench sensors located at the joints. The invention can be used with manipulators that interact with the environment by exchanging a wrench therewith, or with manipulators that simply move an end effector, without contacting the environment in a wrench exchanging mode. The invention can be used in connection with manipulators, or motions, for which some of the terms in the general relations, such as Eq. 6, are equal to zero, or cancel out due to the orientation of the manipulator links. The invention can be used with manipulators having any number of joints and degrees of freedom.

References

[1] B Armstrong, *Control Of Machines With Friction*, Kluwer Academic Publishers, Boston, USA, 1991.

[2] M. R Popovic, K. B. Shimoga and A. A. Goldenberg, *Model Based Compensation Of Friction In Direct Drive Robotic Arms*, J. of Studies in Informatics and Control, Vol. 3, No 1., pp. 75–88, March 1994.

[3] C. Canudas de Wit, *Adaptive Control Of Partially Known Systems*, Elsevier, Boston, USA, 1988.

[4] M. R. Popovic, D. M. Gorinevsky and A. A. Goldenberg, *Accurate Positioning Of Devices With Nonlinear Friction Using Fuzzy Logic Pulse Controller*, Int. Symposium of Experimental Robotics, ISER' 95, preprints, pp. 206–211.

[5] J. Y. S. Luh, W. B. Fisher and R. P. Paul, *Joint Torque Control By Direct Feedback For Industrial Robots*, IEEE Trans. on Automatic Control, vol. 28, No 1, February 1983.

[6] L. E. Pfeffer, O. Khatib and J. Hake, *Joint Torque Sensory Feedback Of A PUMA Manipulator*, IEEE Trans. on Robotics and Automation, vol. 5, No 4, pp. 418–425, 1989.

[7] Hake J. C. and Farah J., *Design Of A Joint Torque Sensor For The Unimation PUMA 500 Arm*, Final Report, ME210, University of Stanford, Calif., 1984.

[8] H. West, E. Papadopoulos, S. Dubowsky and H. Chean, *A Method For Estimating The Mass Properties Of A Manipulator By Measuring The Reaction Moment At Its Base*, Proc. IEEE Int. Conf. on Robotics and Automation, 1989.

[9] T. Corrigan and S. Dubowsky, *Emulating Micro-Gravity In Laboratory Studies Of Space Robots*, Proc. ASME Mechanisms Conf., 1994.

[10] R. Volpe and P. Khosla, *An Analysis Of Manipulator Force Control Strategies Applied To An Experimentally Derived Model*, Proc. IEEE/ RSJ Int. Conf. on Intelligent Robots and Systems, pp. 1989–1997, 1992.

[11] M. H. Raibert and J. J. Craig, *Hybrid Position/Force Control of Manipulators*, ASME Journal of Dynamic Systems, Measurement and Control, Vol. 102, 1981, pp. 126–133.

[12] N. Hogan, *Impedance Control, A New Approach to Manipulation*, ASME Journal of Dynamic Systems, Measurement and Control, Vol. 107, 1985, pp. 1–24.

Appendix A

The expressions for the constant parameters used in the torque estimation for the Puma 550 (Eq. 7,8,9) are:

$$A_1 = m_2 r_{2y}(r_{2_z} + d_2)$$

$$A_2 = m_2 r_{2x}(r_{2_z} + d_2) - m_1 a_2 r_{1_z}$$

$$A_3 = -I_{2_{zz}} - (r_{2_x}^2 + r_{2_x} a_2 + r_{2_y}^2)m$$

$$A_4 = -m_2 a_2 r_{2y}$$

$$A_5 = -m_2 r_{2y}(a_2 + r_{2_x})$$

$$A_6 = A_4 - A_5$$

where $a_2$ and $d_2$ are the Denavit-Hartenberg parameters describing the transformation between the frames 1 and 2, $O_2 G_2 = r_2 = r_{2_x} x_2 + r_{2_y} y_2 + r_{2_z} z_2$ (see FIG. 3) and $$I_2 = \begin{pmatrix} I_{2_{xx}} & 0 & 0 \\ 0 & I_{2_{yy}} & 0 \\ 0 & 0 & I_{2_{zz}} \end{pmatrix}$$

in the base $(x_2, y_2, z_2)$.

Having described the invention, what is claimed is:

1. An apparatus for generating a signal that corresponds to the gravity compensated torque actually applied to a link at a rotary joint of a manipulator, said manipulator having a base that is connected to a reference body and a plurality of moveable links, the first being connected to said base through a first joint and each other moveable link being connected through a joint to an adjacent link that is kinematically closer to said reference body, and for each of said movable links, a position sensor that generates a position signal that corresponds to the position of said link relative to said respective adjacent link, said signal generating apparatus comprising:

a. a wrench sensor that is connected between said base and said reference body to generate a base wrench signal that corresponds to the base wrench that is applied between said base and said reference body, expressed at a sensor measurement point;

b. coupled to said position sensors and said wrench sensor, a gravity compensator, which generates a dynamic wrench signal that corresponds to the gravity compensated dynamic component of said base wrench signal, based on said position signals and said base wrench signal; and c. coupled to said gravity compensator and said position sensors, a joint analyzer, which generates a signal that corresponds to the gravity compensated torque that is actually applied to said link at said rotary joint, based on said dynamic wrench signal and said position signals.

2. The signal generator of claim 1, said gravity compensator comprising:

a. coupled to said position sensors, a gravity wrench generator, which generates a signal that corresponds to the gravity component of said base wrench, based on said position signals; and b. coupled to said gravity wrench generator and said wrench sensor, a dynamic wrench signal generator, which generates said signal that corresponds to the gravity compensated dynamic component of said base wrench signal, based on said gravity wrench signal and said base wrench signal.

3. The signal generator of claim 2, said gravity wrench generator comprising:

a. means for generating, for each link for which a position signal is provided, a vector $O_s G_j$ from said sensor measurement point to the center of mass of said link; and b. means for generating a gravity moment signal that corresponds to $$\sum_{j=1}^{n} O_s G_j \times m_j g,$$

where n is the number of said plurality of links, $m_j$ is the mass of link j and g is the acceleration due to gravity.

4. The signal generator of claim 3, said gravity wrench generator further comprising means for generating a gravity force signal that corresponds to $$\sum_{j=1}^{n} m_j g,$$

where n is the number of said plurality of links, $m_j$ is the mass of link j and g is the acceleration due to gravity.

5. The signal generator of claim 2, said gravity wrench generator comprising a look up table that relates, on the one hand combinations of link position signals for all of said links for which a position signal is provided, to, on the other hand a corresponding, predetermined gravity wrench.

6. The signal generator of claim 1, said basis between said signal that corresponds to said gravity compensated torque that is actually applied to said link at said rotary joint on the one hand and, on the other hand, said dynamic wrench signal and said position signals, comprising:

$$\tau_{i+1} = -z_i^t \left[ M_d^{O_i} + \sum_{j=1}^{i} (I_j \dot{\omega}_j + \omega_j \times I_j \omega_j + O_i G_j \times m_j \dot{V}_{G_j}) \right]$$

where:

$\tau_{i+1}$ is said gravity compensated torque that is actually applied to said link at said rotary joint;

$M_d^{O_i}$ is the moment of said dynamic wrench signal, expressed at $O_i$, which is the origin of the axis around which said link to which said torque is actually applied rotates relative to an adjacent link that is kinematically closer to said reference body;

$-z_i^t [\ ]$ is an operator that projects the contents of the square brackets [ ], which is a vector, onto an axis $z_i$, which axis is at $O_i$;

i is the number of said movable links that are kinematically closer to said reference body than said link to which said gravity compensated torque is actually applied; and for each link j of said i movable links:

$I_j$ is the inertia tensor of said link j at its center of mass $G_j$;

$\omega_j$ is the angular velocity of said link j relative to a fixed frame;

$\dot{\omega}_j$ is the angular acceleration of said link j relative to a fixed frame;

$\dot{V}_{G_j}$ is the linear acceleration of the center of mass of said link j relative to a fixed frame;

$O_i G_j$ is the vector between $O_i$ and the center of mass $G_j$ of said link j; and $m_j$ is the mass of said link j.

7. The signal generator of claim 1, said basis between said signal that corresponds to said gravity compensated torque that is actually applied at said rotary joint on the one hand and, on the other hand, said dynamic wrench signal and said position signals, comprising a relationship between said gravity compensated torque and at least one parameter selected from the group consisting of:

$M_d^{O_i}$, which is the moment of said dynamic wrench signal, expressed at $O_i$, which is the origin of the axis around which said link to which said torque is actually applied rotates relative to an adjacent link that is kinematically closer to said reference body; and for each link j of i links, where i is the number of links that are kinematically closer to said reference body than said link to which said torque is actually applied:

$I_j$, which is the inertia tensor of said link j at its center of mass $G_j$;

$\omega_j$, which is the angular velocity of said link j relative to a fixed frame;

$\dot{\omega}_j$, which is the angular acceleration of said link j relative to a fixed frame;

$\dot{V}_{G_j}$, which is the linear acceleration of the center of mass of said link j relative to a fixed frame;

$O_i G_j$, which is the vector between $O_i$ and the center of mass $G_j$ of said link j; and $m_j$, which is the mass of said link j.

8. The signal generator of claim 2, said gravity wrench generator comprising:

a. means for generating, for each link for which a position signal is provided, a vector $O_s G_j$ from said sensor measurement point to the center of mass of said link; and b. means for generating a gravity moment signal that corresponds to any position dependent components of $$\sum_{j=1}^{n} O_s G_j \times m_j g,$$

where n is the number of said plurality of links, $m_j$ is the mass of link j and g is the acceleration due to gravity.

9. An apparatus for generating a signal that corresponds to the gravity compensated force actually applied to a link at a linear joint of a manipulator, said manipulator having a base that is connected to a reference body and a plurality of moveable links, the first being connected to said base through a first joint and each other moveable link being connected through a joint to an adjacent link that is kinematically closer to said reference body, and for each of said movable links, a position sensor that generates a position signal that corresponds to the position of said link relative to said respective adjacent link, said signal generating apparatus comprising:

a. a wrench sensor that is connected between said base and said reference body to generate a base wrench signal that corresponds to the base wrench that is applied between said base and said reference body, expressed at a sensor measurement point;
 b. coupled to said position sensors and said wrench sensor, a gravity compensator, which generates a dynamic wrench signal that corresponds to the gravity compensated dynamic component of said base wrench signal, based on said position signals and said base wrench signal; and
 c. coupled to said gravity compensator and said position sensors, a joint analyzer, which generates a signal that corresponds to the gravity compensated force that is actually applied to said link at said linear joint, based on said dynamic wrench signal and said position signals.

10. The signal generator of claim 9, said gravity compensator comprising:

a. coupled to said position sensors, a gravity wrench generator, which generates a signal that corresponds to the gravity component of said base wrench, based on said position signals; and
 b. coupled to said gravity wrench generator and said wrench sensor, a dynamic wrench signal generator, which generates said signal that corresponds to the gravity compensated dynamic component of said base wrench signal, based on said gravity wrench signal and said base wrench signal.

11. The signal generator of claim 10, said gravity wrench generator comprising:

a. means for generating, for each link for which a position signal is provided, a vector $O_s G_j$ from said sensor measurement point to the center of mass of said link; and
 b. means for generating a gravity moment signal that corresponds to $$\sum_{j=1}^{n} O_s G_j \times m_j g,$$

where n is the number of said plurality of links, $m_j$ is the mass of link j and g is the acceleration due to gravity.

12. The signal generator of claim 11, said gravity wrench generator further comprising means for generating a gravity force signal that corresponds to $$\sum_{j=1}^{n} m_j g,$$

where n is the number of said plurality of links, $m_j$ is the mass of link j and g is the acceleration due to gravity.

13. The signal generator of claim 10, said gravity wrench generator comprising a look up table that relates, on the one hand combinations of position signals for all of said links for which a position signal is provided, to, on the other hand a corresponding, predetermined gravity wrench.

14. The signal generator of claim 9, said basis between said signal that corresponds to said gravity compensated force that is actually applied to said link at said linear joint on the one hand and, on the other hand, said dynamic wrench signal and said position signals, comprising:

$$f_{i+1} = -z_i' \left[ F_d + \sum_{j=1}^{i} m_j \dot{V}_{G_j} \right]$$

where:

$f_{i+1}$ is the gravity compensated force that is actually applied to said link at said linear joint;

$F_d$ is the force of said dynamic wrench signal;

$-z_i'[\ ]$ is an operator that projects the contents of the square brackets [ ], which is a vector, onto an axis $z_i$, which axis is at $O_i$, which is the origin of the axis along which said link to which said force is actually applied translates relative to an adjacent link that is kinematically closer to said reference body;

i is the number of said movable links that are kinematically closer to said reference body than said link to which said gravity compensated force is actually applied; and for each link j of said i movable links:

$\dot{V}_G$ is the linear acceleration of the center of mass G of said link j relative to a fixed frame; and m is the mass of said link j.

15. The signal generator of claim 10, said gravity wrench generator comprising:

a. means for generating, for each link for which a position signal is provided, a vector $O_s G_j$ from said sensor measurement point to the center of mass of said link; and
 b. means for generating a gravity moment signal that corresponds to any position dependent components of $$\sum_{j=1}^{n} O_s G_j \times m_j g,$$

where n is the number of said plurality of links, $m_j$ is the mass of link j and g is the acceleration due to gravity.

16. An apparatus for generating a signal that corresponds to the gravity compensated torque actually applied to a link at a rotary joint of a manipulator, said manipulator having a base that is connected to a reference body, and a moveable link that is connected to said base through said rotary joint, and a position sensor that generates a position signal that corresponds to the position of said link relative to said base, said signal generating apparatus comprising:

a. a wrench sensor that is connected between said base and said reference body to generate a base wrench signal that corresponds to the base wrench that is applied between said base and said reference body, expressed at a sensor measurement point;

b. coupled to said position sensor and said wrench sensor, a gravity compensator, which generates a dynamic wrench signal that corresponds to the gravity compensated dynamic component of said base wrench signal, based on said position signal and said base wrench signal; and c. coupled to said gravity compensator and said position sensor, a joint analyzer, which generates a signal that corresponds to the gravity compensated torque that is actually applied to said link at said rotary joint, based on said dynamic wrench signal and said position signal.

17. The signal generator of claim 16, said gravity compensator comprising:

a. coupled to said position sensor, a gravity wrench generator, which generates a signal that corresponds to the gravity component of said base wrench, based on said position signal; and b. coupled to said gravity wrench generator and said wrench sensor, a dynamic wrench signal generator, which generates said signal that corresponds to the gravity compensated dynamic component of said base wrench signal, based on said gravity wrench signal and said base wrench signal.

18. The signal generator of claim 17, said gravity wrench generator comprising:

a. means for generating a vector $O_sG$ from said sensor measurement point to the center of mass of said link; and b. means for generating a gravity moment signal that corresponds to $O_sG \times m\, g$, where m is the mass of said link and g is the acceleration due to gravity.

19. The signal generator of claim 17, said gravity wrench generator comprising a look up table that relates, on the one hand said position signal for said link to, on the other hand a corresponding, predetermined gravity wrench.

20. The signal generator of claim 16, said basis between said signal that corresponds to said gravity compensated torque that is actually applied to said link at said rotary joint on the one hand and, on the other hand, said dynamic wrench signal and said position signals, comprising: $\tau_1 = -z_0{}^T[M_d{}^O{}_0]$ where:

$\tau_1$ is the gravity compensated torque that is actually applied to said link at said rotary joint;

$M_d{}^O{}_0$ is the moment of said dynamic wrench signal, expressed at $O_0$, which is the origin of the axis around which said link to which said gravity compensated torque is actually applied rotates relative to said base;

$-z_p{}^T[\ ]$ is an operator that projects the contents of the square brackets [ ], which is a vector, onto an axis $z_0$, which axis is at $O_0$.

21. The signal generator of claim 17, said gravity wrench generator comprising:

a. means for generating a vector $O_sG$ from said sensor measurement point to the center of mass of said link; and b. means for generating a gravity moment signal that corresponds to any position dependent components of $O_sG \times m\, g$, where m is the mass of said link and g is the acceleration due to gravity.

22. An apparatus for generating a signal that corresponds to the gravity compensated force actually applied to a link at a linear joint of a manipulator, said manipulator having a base that is connected to a reference body, and a moveable link that is connected to said base through said linear joint, and a position sensor that generates a position signal that corresponds to the position of said link relative to said base, said signal generating apparatus comprising:

a. a wrench sensor that is connected between said base and said reference body to generate a base wrench signal that corresponds to the base wrench that is applied between said base and said reference body, expressed at a sensor measurement point;

b. coupled to said position sensor and said wrench sensor, a gravity compensator, which generates a dynamic wrench signal that corresponds to the gravity compensated dynamic component of said base wrench signal, based on said position signal and said base wrench signal; and c. coupled to said gravity compensator and said position sensor, a joint analyzer, which generates a signal that corresponds to said gravity compensated force that is actually applied to said link at said linear joint, based on said dynamic wrench signal and said position signal.

23. The signal generator of claim 22, said gravity compensator comprising:

a. coupled to said position sensor, a gravity wrench generator, which generates a signal that corresponds to the gravity component of said base wrench, based on said position signal; and b. coupled to said gravity wrench generator and said wrench sensor, a dynamic wrench signal generator, which generates said signal that corresponds to the gravity compensated dynamic component of said base wrench signal, based on said gravity wrench signal and said base wrench signal.

24. The signal generator of claim 23, said gravity wrench generator comprising:

a. means for generating a vector $O_sG$ from said sensor measurement point to the center of mass of said link; and b. means for generating a gravity moment signal that corresponds to $O_sG \times m\, g$, where m is the mass of said link and g is the acceleration due to gravity.

25. The signal generator of claim 23, said gravity wrench generator comprising a look up table that relates, on the one hand said position signal to, on the other hand a corresponding, predetermined gravity wrench.

26. The signal generator of claim 22, said basis between said signal that corresponds to said gravity compensated force that is actually applied to said link at said linear joint on the one hand and, on the other hand, said dynamic wrench signal and said position signals, comprising: $f_1 = -z_0{}^T[F_d]$ where:

$f_1$ is the gravity compensated force that is actually applied to said link at said rotary joint;

$F_d$ is the force of said dynamic wrench signal; and $-z_0{}^T[\ ]$ is an operator that projects the contents of the square brackets [ ], which is a vector, onto an axis $z_0$, which axis is at $O_0$, which is the origin of the axis along which said link to which said gravity compensated force is actually applied translates relative to said base.

27. The signal generator of claim 23, said gravity wrench generator comprising:

a. means for generating a vector $O_sG$ from said sensor measurement point to the center of mass of said link; and b. means for generating a gravity moment signal that corresponds to any position dependent components of $O_sG \times m g$, where m is the mass of said link and g is the acceleration due to gravity.

28. A method for generating a signal that corresponds to the gravity compensated torque actually applied to a link at a rotary joint of a manipulator, said manipulator having a base that is connected to a reference body and a plurality of moveable links, the first being connected to said base through a first joint and each other moveable link being connected through a joint to an adjacent link that is kinematically closer to said reference body, and for each of said movable links, a position sensor that generates a position signal that corresponds to the position of said link relative to said adjacent link, said signal generating method comprising the steps of:
   a. generating a base wrench signal that corresponds to the base wrench that is applied between said base and said reference body, expressed at a sensor measurement point;
   b. compensating for gravity by generating a dynamic wrench signal that corresponds to the gravity compensated dynamic component of said base wrench signal, based on said position signals and said base wrench signal; and
   c. generating a signal that corresponds to said gravity compensated torque that is actually applied to said link at said rotary joint, based on said dynamic wrench signal and said position signals.

29. The signal generating method of claim 28, said step of compensating for gravity comprising the steps of:
   a. generating the gravity wrench signal by generating a signal that corresponds to the gravity component of said base wrench, based on said position signals; and
   b. compensating for gravity, based on said gravity wrench signal and said base wrench signal.

30. The signal generating method of claim 29, said step of generating the gravity wrench signal comprising the steps of:
   a. generating a position vector by, for each link for which a position signal is provided, generating a vector $O_sG_j$ from said sensor measurement point to the center of mass of said link; and
   b. generating a gravity moment signal that corresponds to $$\sum_{j=1}^{n} O_sG_j \times m_j g,$$

where n is the number of said plurality of links, $m_j$ is the mass of link j and g is the acceleration due to gravity.

31. The signal generating method of claim 30, said step of generating the gravity wrench signal further comprising the step of generating a gravity force signal that corresponds to $$\sum_{j=1}^{n} m_j g,$$

where n is the number of said plurality of links, $m_j$ is the mass of link j and g is the acceleration due to gravity.

32. The signal generating method of claim 30, said step of generating the gravity wrench signal comprising the steps of using a predetermined table that relates, on the one hand combinations of position signals for all of said links for which a position signal is provided, to, on the other hand a corresponding, predetermined gravity wrench, looking up the gravity wrench that is related to said combination of generated position signals.

33. The signal generating method of claim 31, said step of generating the gravity wrench comprising the steps of:
   a. generating a position vector by, for each link for which a position signal is provided, generating a vector $O_sG_j$ from said sensor measurement point to the center of mass of said link; and
   b. generating a gravity moment signal that corresponds to any position dependent components of $$\sum_{j=1}^{n} O_sG_j \times m_j g,$$

where n is the number of said plurality of links, $m_j$ is the mass of link j and g is the acceleration due to gravity.

34. The signal generating method of claim 31 said basis between said signal that corresponds to said gravity compensated torque that is actually applied to said link at said rotary joint on the one hand and, on the other hand, said dynamic wrench signal and said position signals, being established by the step of evaluating the following relation:

$$\tau_{i+1} = -z_i^t \left[ M_d^{O_i} + \sum_{j=1}^{i} (I_j \dot{\omega}_j + \omega_j \times I_j \omega_j + O_iG_j \times m_j V_{G_j}) \right]$$

where:

$\tau_{i+1}$ is said gravity compensated torque that is actually applied to said link at said rotary joint;

$M_d^{O_i}$ is the moment of said dynamic wrench signal, expressed at $O_i$, which is the origin of the axis around which said link to which said torque is actually applied rotates relative to an adjacent link that is kinematically closer to said reference body;

$-z_i^t[\ ]$ is an operator that projects the contents of the square brackets $[\ ]$, which is a vector, onto an axis $z_i$, which axis is at $O_i$;

i is the number of said movable links that are kinematically closer to said reference body than said link to which said gravity compensated torque is actually applied; and for each link j of said i movable links:

$I_j$ is the inertia tensor of said link j at its center of mass $G_j$;

$\omega_j$ is the angular velocity of said link j relative to a fixed frame;

$\dot{\omega}_j$ is the angular acceleration of said link j relative to a fixed frame;

$\dot{V}_{G_j}$ is the linear acceleration of the center of mass of said link j relative to a fixed frame;

$O_iG_j$ is the vector between $O_i$ and the center of mass $G_j$ of said link j; and $m_j$ is the mass of said link j.

35. The signal generating method of claim 31, said basis between said signal that corresponds to said gravity compensated torque that is actually applied at said rotary joint on the one hand and, on the other hand, said dynamic wrench signal and said position signals, being established by the step of evaluating a relationship between said gravity compensated torque and at least one parameter selected from the group consisting of:

$M_d^{O_i}$, which is the moment of said dynamic wrench signal, expressed at $O_i$, which is the origin of the axis around which said link to which said torque is actually applied rotates relative to an adjacent link that is kinematically closer to said reference body; and for each link j of i links, where i is the number of links that are kinematically closer to said reference body than said link to which said torque is actually applied:

$I_j$, which is the inertia tensor of said link j at its center of mass $G_j$;

$\omega_j$, which is the angular velocity of said link j relative to a fixed frame;

$\dot{\omega}_j$, which is the angular acceleration of said link j relative to a fixed frame;

$\dot{V}_{G_j}$, which is the linear acceleration of the center of mass of said link j relative to a fixed frame;

$O_iG_j$ which is the vector between $O_i$ and the center of mass $G_j$ of said link j; and $m_j$, which is the mass of said link j.

36. A method for generating a signal that corresponds to the gravity compensated force actually applied to a link at a linear joint of a manipulator, said manipulator having a base that is connected to a reference body and a plurality of moveable links, the first being connected to said base through a first joint and each other moveable link being connected through a joint to an adjacent link that is kinematically closer to said reference body, and for each of said movable links, a position sensor that generates a position signal that corresponds to the position of said link relative to said adjacent link, said signal generating method comprising the steps of:

a. generating a base wrench signal that corresponds to the base wrench that is applied between said base and said reference body, expressed at a sensor measurement point;

b. compensating for gravity by generating a dynamic wrench signal that corresponds to the gravity compensated dynamic component of said base wrench signal, based on said position signals and said base wrench signal; and c. generating a signal that corresponds to said gravity compensated force that is actually applied to said link at said linear joint, based on said dynamic wrench signal and said position signals.

37. The signal generating method of claim 36 said basis between said signal that corresponds to said gravity compensated force that is actually applied to said link at said linear joint on the one hand and, on the other hand, said dynamic wrench signal and said position signals, being established by the step of evaluating the following relation:

$$f_{i+1} = -z_i' \left[ F_d + \sum_{j=1}^{i} m_j \dot{V}_{G_j} \right]$$

where:

$f_{i+1}$ is the gravity compensated force that is actually applied to said link at said linear joint;

$F_d$ is the force of said dynamic wrench signal;

$-z_i'[\ ]$ is an operator that projects the contents of the square brackets [ ], which is a vector, onto an axis $z_i$, which axis is at $O_i$, which is the origin of the axis along which said link to which said force is actually applied translates relative to an adjacent link that is kinematically closer to said reference body;

i is the number of said movable links that are kinematically closer to said reference body than said link to which said gravity compensated force is actually applied; and for each link j of said i movable links:

$\dot{V}_G$ is the linear acceleration of the center of mass G of said link j relative to a fixed frame; and m is the mass of said link j.

38. A method for generating a signal that corresponds to the gravity compensated torque actually applied to a link at a rotary joint of a manipulator, said manipulator having a base that is connected to a reference body and that is connected to said moveable link through said rotary joint and a position sensor that generates a position signal that corresponds to the position of said link relative to said base, said signal generating method comprising the steps of:

a. generating a base wrench signal that corresponds to the base wrench that is applied between said base and said reference body, expressed at a sensor measurement point;

b. compensating for gravity by generating a dynamic wrench signal that corresponds to the gravity compensated dynamic component of said base wrench signal, based on said position signal and said base wrench signal; and c. generating a signal that corresponds to said gravity compensated torque that is actually applied to said link at said rotary joint, based on said dynamic wrench signal and said position signal.

39. A method for generating a signal that corresponds to the gravity compensated force actually applied to a link at a linear joint of a manipulator, said manipulator having a base that is connected to a reference body and that is connected to said moveable link through said linear joint and a position sensor that generates a position signal that corresponds to the position of said link relative to said base, said signal generating method comprising the steps of:

a. generating a base wrench signal that corresponds to the base wrench that is applied between said base and said reference body, expressed at a sensor measurement point;

b. compensating for gravity by generating a dynamic wrench signal that corresponds to the gravity compensated dynamic component of said base wrench signal, based on said position signal and said base wrench signal; and c. generating a signal that corresponds to said gravity compensated force that is actually applied to said link at said linear joint, based on said dynamic wrench signal and said position signal.

* * * * *

UNITED STATES PATENT AND TRADEMARK OFFICE
CERTIFICATE OF CORRECTION

PATENT NO. : 5,767,648
DATED : June 16, 1998
INVENTOR(S) : Morel et al.

It is certified that error appears in the above-indentified patent and that said Letters Patent is hereby corrected as shown below:

Column 25, line 51, correction in text:

change "$-z_p^t[\ ]$" to -- $-z_0^t[\ ]$ -- to read:

"$-z_0^t[\ ]$ is an operator that protects"

Column 28, line 26, correction in text:

change "$\tau_{1+1}$" to -- $\tau_{i+1}$ -- to read:

"$\tau_{i+1}$ is said gravity compensated torque"

Column 29, line 9, correction in text:

after "$O_iG_j$" insert a comma --,-- to read:

"$O_iG_j$, which is the vector between $O_i$"

Signed and Sealed this

Twenty-fifth Day of April, 2000

Attest:

Q. TODD DICKINSON

*Attesting Officer*     *Director of Patents and Trademarks*